(12) United States Patent
Matsumoto

(10) Patent No.: US 12,500,667 B2
(45) Date of Patent: Dec. 16, 2025

(54) METHOD AND APPARATUS FOR ESTIMATING QUALITY OF OPTICAL SIGNAL

(71) Applicant: NATIONAL INSTITUTE OF ADVANCED INDUSTRIAL SCIENCE AND TECHNOLOGY, Tokyo (JP)

(72) Inventor: Ryousuke Matsumoto, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 270 days.

(21) Appl. No.: 18/560,408

(22) PCT Filed: May 13, 2022

(86) PCT No.: PCT/JP2022/020141
§ 371 (c)(1),
(2) Date: Nov. 13, 2023

(87) PCT Pub. No.: WO2022/249896
PCT Pub. Date: Dec. 1, 2022

(65) Prior Publication Data
US 2024/0250752 A1    Jul. 25, 2024

(30) Foreign Application Priority Data

May 27, 2021 (JP) .................. 2021-088931

(51) Int. Cl.
*H04B 10/079* (2013.01)
*H04J 14/00* (2006.01)

(52) U.S. Cl.
CPC . *H04B 10/07955* (2013.01); *H04B 10/07953* (2013.01); *H04J 14/05* (2023.08)

(58) Field of Classification Search
None
See application file for complete search history.

(56) References Cited

U.S. PATENT DOCUMENTS

2013/0183033 A1* 7/2013 Hayashi ............... H04J 14/05
398/43
2017/0033866 A1   2/2017 Wang et al.

FOREIGN PATENT DOCUMENTS

EP        2797244       10/2014
JP      2013-150287      8/2013
(Continued)

OTHER PUBLICATIONS

Hayashi et al., "Behavior of Inter-Core Crosstalk as a Noise and Its Effect on Q-Factor in Multi-Core Fiber**", May 2014, IEICE Trans. Commun., vol. E97-B, No. 5, pp. 936-944 (Year: 2014).*
(Continued)

*Primary Examiner* — David W Lambert
(74) *Attorney, Agent, or Firm* — JCIPRNET

(57) ABSTRACT

In order to estimate an upper limit value of a bit error rate in an optical transmission unit for an optical transmission system in which an optical sender and an optical receiver are connected each other through the optical transmission unit that utilizes plural spatial resources, and coherent detection is used, after obtaining an amplitude of each crosstalk for different spatial resource in the optical transmission unit and variance of additive white Gaussian noise in the optical transmission system, by changing a value of an independent variable in a formula of the bit error rate, a minimum value of the formula is searched for as the upper limit value of the bit error rate. The formula is represented by the amplitude of each crosstalk, the variance of the additive white Gaussian noise and the independent variable that is different from a time axis.

11 Claims, 15 Drawing Sheets

(56) References Cited

FOREIGN PATENT DOCUMENTS

| JP | 2014-165895 | 9/2014 |
|---|---|---|
| JP | 6400119 | 10/2018 |
| WO | 2013094568 | 6/2013 |

OTHER PUBLICATIONS

Pinheiro et al., "Analysis of Inter-Core Crosstalk in Weakly-Coupled Multi-Core Fiber Coherent Systems", Jan. 1, 2021, Journal of Lightwave Technology, vol. 39, No. 1, pp. 42-54 (Year: 2021).*
P. J. Winzer et al., "Penalties from In-Band Crosstalk for Advanced Optical Modulation Formats", ECOC Technical Digest, Jan. 2011, pp. 1-4.
Seb J. Savory, "Digital Coherent Optical Receivers: Algorithms and Subsystems", IEEE Journal of Selected Topics in Quantum Electronics, Sep./Oct. 2010, pp. 1164-1179, vol. 16, No. 5.
Kazuro Kikuchi, "Fundamentals of Coherent Optical Fiber Communications", Journal of Lightwave Technology, Jan. 1, 2016, pp. 157-179, vol. 34, No. 1.
International Telecommunication Union, "Forward error correction for high bit-rate DWDM submarine systems", ITU-T Recommendation G.975.1, Feb. 2004, pp. 1-58.
Charles Clos, "A Study of Non-Blocking Switching Networks", The Bell System Technical Journal, Mar. 1953, pp. 406-424, vol. 32, No. 2.
Tetsuya Hayashi et al., "Behavior of Inter-Core Crosstalk as a Noise and Its Effect on Q-Factor in Multi-Core Fiber", IEICE Trans. Commun., May 2014, pp. 936-944, vol. E97-B, No. 5.
Bruno R. P. Pinheiro et al., "Analysis of Inter-core Crosstalk in Weakly-coupled Multi-core Fiber Coherent Systems", Journal of Lightwave Technology, Sep. 18, 2020, pp. 42-54, vol. 39, No. 1.
"International Search Report (Form PCT/ISA/210) of PCT/JP2022/020141", mailed on Aug. 2, 2022, with English translation thereof, pp. 1-5.
"Written Opinion of the International Searching Authority (Form PCT/ISA/237) of PCT/JP2022/020141", mailed on Aug. 2, 2022, with English translation thereof, pp. 1-6.

\* cited by examiner

METHOD AND APPARATUS FOR ESTIMATING QUALITY OF OPTICAL SIGNAL

CROSS-REFERENCE TO RELATED APPLICATION

This application is a 371 application of the International PCT application serial no. PCT/JP2022/020141, filed on May 13, 2022, which claims the priority benefits of Japan Patent Application No. 2021-088931, filed on May 27, 2021. The entirety of each of the above-mentioned patent applications is hereby incorporated by reference herein and made a part of this specification.

TECHNICAL FIELD

This invention relates to a technique of estimating an influence of leaking light (i.e. crosstalk) that occurs in optical transmission lines including optical switches.

BACKGROUND ART

Applications such as cloud computing and big data analysis that are becoming familiar in recent years greatly contribute to the development of data centers, and according to a certain survey, IP traffic at data centers around the world are increasing at a rate of 25% or more per year, and it is predicted that this trend continues in the years to come. On the other hand, 75% or more of the IP traffic at a data center is processed in the data center, and therefore expanding a scale of the network, lowering power consumption of the network and widening the bandwidth of the network are urgent needs at the data center. In a current situation, broadband electric switches having terabit-class throughputs are connected at multiple stages to construct a large-scale network in a data center. However, as Moore's law comes to an end, miniaturization of the electric switches sees a coming limit, and it becomes difficult in this situation to achieve lower power consumption and a broader bandwidth than now.

Optical switches are not for flexible processing such as packet exchange performed by the electric switches due to a property of line switching, yet is superior in energy efficiency that is a ratio of power consumption with respect to a bandwidth. On the other hand, performance of an optical switch greatly depends on leaking light (i.e. crosstalk) between optical lines, and therefore it is difficult to estimate and define a maximum throughput and a scale of optical switches. Non-Patent Literature 1 reports a study conducted by adding one interference signal to a main signal, and comparing an influence of crosstalk by an experiment with that by numerical value simulation. A similar problem is regarded as a problem of an optical transmission system that uses spatial multiplexing, and Patent Literature 1 proposes a method for estimating performance taking variations of crosstalk into account.

However, most of existing techniques also including techniques other than Non-Patent Literature 1 and Patent Literature 1 are methods (i.e. Gaussian approximation) that regard an amplitude fluctuation of an interference signal as a normal distribution, and excessively estimate deterioration of signal quality caused by the crosstalk. The influence of excessively estimated deterioration caused by the crosstalk requests an extra margin for design of an optical transmission system, and becomes an obstacle in a scene to maximize system performance from viewpoints of a throughput, a transmission distance, and a switch scale. Furthermore, the conventional techniques of Non-Patent Literature 1 and Patent Literature 1 target optical transmission systems for one interference component or one averaged interference component, and cannot accurately analyze a mutual interaction caused between optical interferences of plural signals.

PRIOR TECHNICAL LITERATURES

Patent Literatures

Patent Literature 1: International Publication Gazette WO2013/0945678A1 WO2013/094568A1
Patent Literature 2: Japanese Patent Gazette No. 6400119

NON-PATENT LITERATURES

Non-Patent Literatures

Non-Patent Literatures 1: P. J. Winzer, A. H. Gnauck, A. Konczykowska, F. Jorge, and J.-Y. Dupuy, "Penalties from In-Band Crosstalk for Advanced Optical Modulation Formats," Proc. European Conference and Exhibition on Optical Communication (ECOC), Paper Tu.5.B.7, 2011
Non-Patent Literature 2: S. Savory, "Digital coherent optical receivers: Algorithms and subsystems," IEEE Journal of Selected Topics in Quantum Electronics", vol. 16, no. 5, pp. 1164-1179, 2010
Non-Patent Literature 3: K. Kikuchi, "Fundamentals of Coherent Optical Fiber Communications," IEEE/OSA Journal of Lightwave Technology, vol. 34, no. 1. pp. 157-179, 2016
Non-Patent Literature 4: ITU-T Recommendation G.975.1, "Forward error correction for high bit-rate DWDM submarine systems"
Non-Patent Literature 5: C. Clos, "A study of non-blocking switching networks," The Bell System Technical Journal, vol. 32, no. 2, pp. 406-424, 1953

SUMMARY OF THE INVENTION

Problem to be Solved by the Invention

Therefore, as one aspect, an object of this invention is to provide a technique for accurately estimating an influence of crosstalk.

Means for Solving the Problem

An estimation method relating to this invention is an estimation method for estimating an upper limit value of a bit error rate in an optical transmission unit for an optical transmission system in which an optical sender and an optical receiver are connected each other through the optical transmission unit that utilizes plural spatial resources, and coherent detection is used, and the estimation method includes processing of (A) calculating an amplitude of each crosstalk for different spatial resource in the optical transmission unit based on a measurement result of optical power in the optical sender and a measurement result of optical power in the optical receiver; (B) calculating variance of additive white Gaussian noise in the optical transmission system from a Signal-to-Noise Power Ratio or an Optical Signal-to-Noise Power Ratio, which is obtained based on an electric signal after coherent detection and photoelectric conversion; and (C) by changing a value of an independent variable in a formula of the bit error rate, searching for a minimum value of the formula as the upper limit value of the bit error rate, wherein the formula is represented by the amplitude of each crosstalk, the variance of the additive white Gaussian noise and the independent variable that is different from a time axis.

DESCRIPTION OF EMBODIMENTS

Embodiment 1

Figure 1:
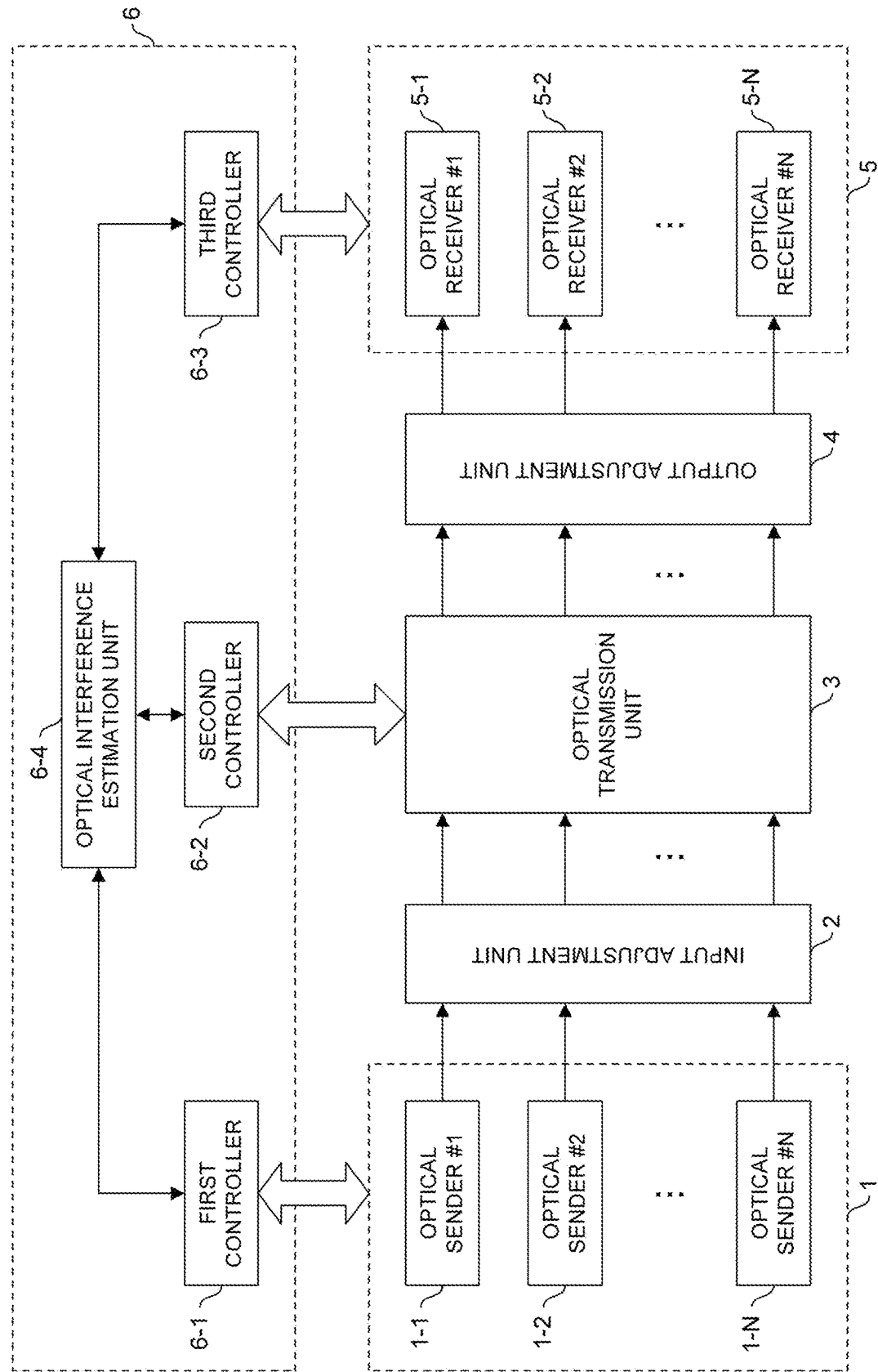
FIG. 1 is a diagram depicting a configuration example of an optical transmission system relating to a first embodiment.

First, an example of an optical transmission system according to the present embodiment will be described. FIG. 1 illustrates an overview of the optical transmission system relating to the present embodiment. The optical transmission system includes an optical sender 1, an input adjustment unit 2, an optical transmission unit 3, an output adjustment unit 4, an optical receiver 5, and a controller 6. The optical sender 1 includes, for example, N optical senders (1-1 to 1-N). Similarly, the optical receiver 5 includes, for example, N optical receivers (5-1 to 5-N). It is assumed that the optical transmission unit 3 transmits plural optical signals using spatial resources, and optical switches and/or spatial multiplexing fibers such as multi-cores and multi-modes fibers are cited as examples. A single carrier or wavelength division multiplexing optical signal generated by the optical sender 1 is input to the input adjustment unit 2 for converting the single carrier or wavelength division multiplexing optical signal into an input format suitable to the optical transmission unit 3. Examples of the input adjustment unit 2 include an input polarization adjustment function of a polarization dependent-type optical switch, and a conversion function for connecting from a single-mode fiber to a specific core or mode of a spatial multiplexing fiber.

Although the optical transmission unit 3 transmits an optical signal allocated to each spatial resource, leaking light actually occurs even between ideally independent spatial resources, and becomes an interference component (i.e. crosstalk). The optical signal output from the optical transmission unit 3 is input to the output adjustment unit 4 to execute a reverse operation from that of the input adjustment unit 2. For example, the reverse operation include an input polarization adjustment function of a polarization dependent-type optical receiver, and a conversion function for connecting from a specific core or mode of a spatial multiplexing fiber to a single-mode fiber. The optical receiver 5 performs differential or coherent detection on the input optical signal.

The controller 6 plays a role of controlling a combination of the functions included in the optical sender 1, the optical transmission unit 3, and the optical receiver 5, and includes a first controller 6-1 for the optical sender 1, a second controller 6-2 for the optical transmission line 3, a third controller 6-3 for the optical receiver 5, and an optical interference estimation unit 6-4. The optical interference estimation unit 6-4 cooperates with the first controller 6-1, the second controller 6-2, and the third controller 6-3 according to a condition to analyze and estimate an influence of quality deterioration brought by the interference component that occurs in the optical transmission unit 3.

Figure 2:
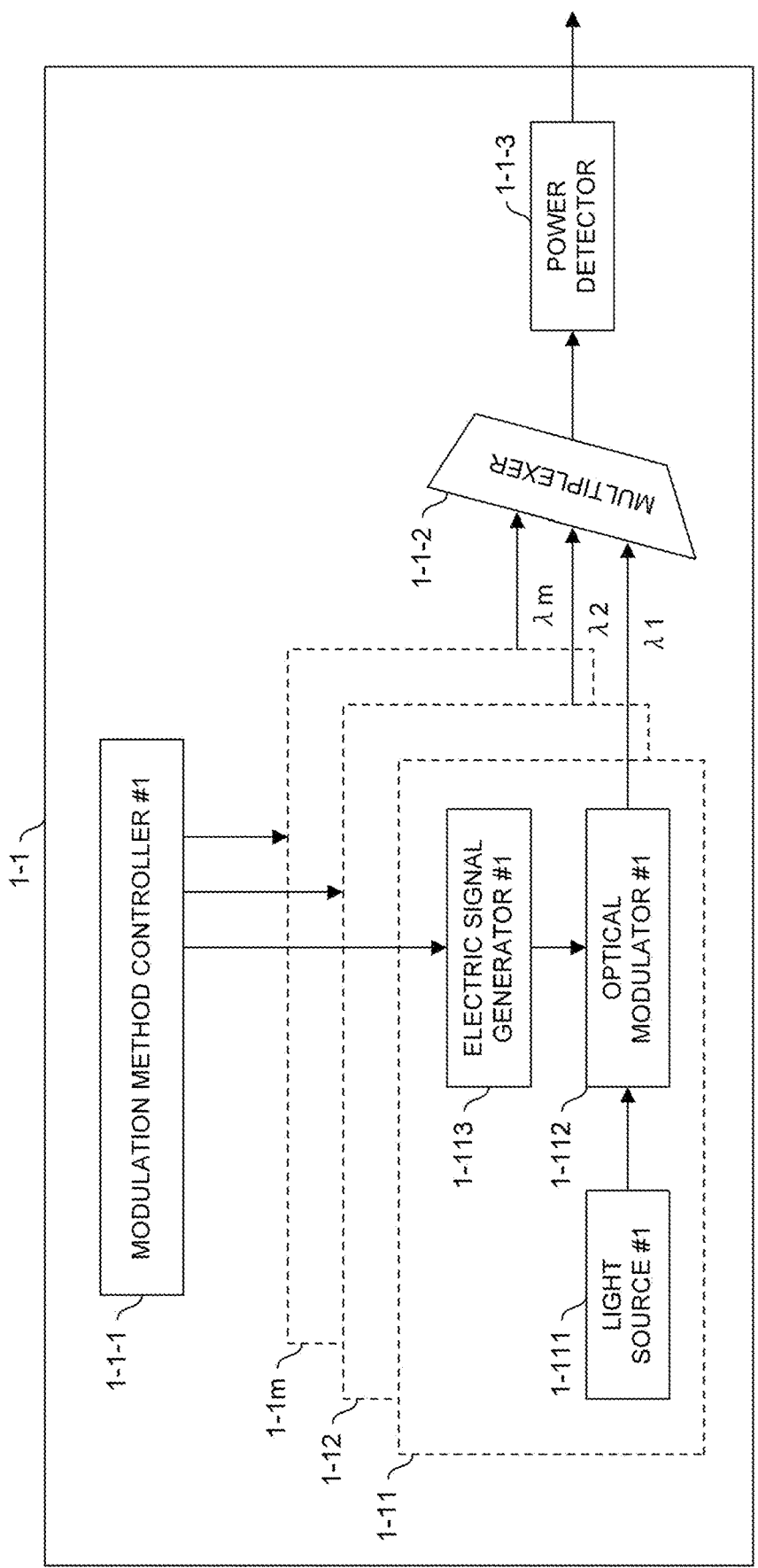
FIG. 2 is a diagram depicting a configuration example of an optical sender relating to the first embodiment.

FIG. 2 is a diagram illustrating a configuration of the optical sender 1-1 included in the optical sender 1. Note that the other optical senders 1-2 to 1-N also employ the same configuration. The optical sender 1-1 includes a modulation method controller 1-1-1, optical signal generators 1-11 to 1-1$m$, a multiplexer 1-1-2, and a power detector 1-1-3. Note that m represents a degree of the wavelength multiplexing. Each optical signal generator generates an optical signal based on a signal format set by the modulation method controller 1-1-1. For example, the optical signal generator 1-11 includes a light source 1-111, an optical modulator 1-112, and an electric signal generator 1-113.

Continuous light of an optical wavelength $\lambda 1$ output from the light source 1-111 is input to the optical modulator 1-112, and the optical modulator 112 modulates the input continuous light using an electric signal received from the electric signal generator 1-113. The same processing is also executed by the optical signal generators 1-12 to 1-1$m$, and optical signals of generated optical wavelengths $\lambda 1$ to $\lambda m$ are input to the multiplexer 1-1-2. The multiplexer 1-1-2 generates one optical Wavelength Division Multiplexing (WDM) signal from the m input optical signals. When m is one, the WDM signal is a single carrier signal, and the multiplexer 1-1-2 can be omitted depending on a condition. As needed, optical power of the single carrier or the WDM signal output from the multiplexer 1-1-2 is measured by the power detector 1-1-3.

Figure 3:
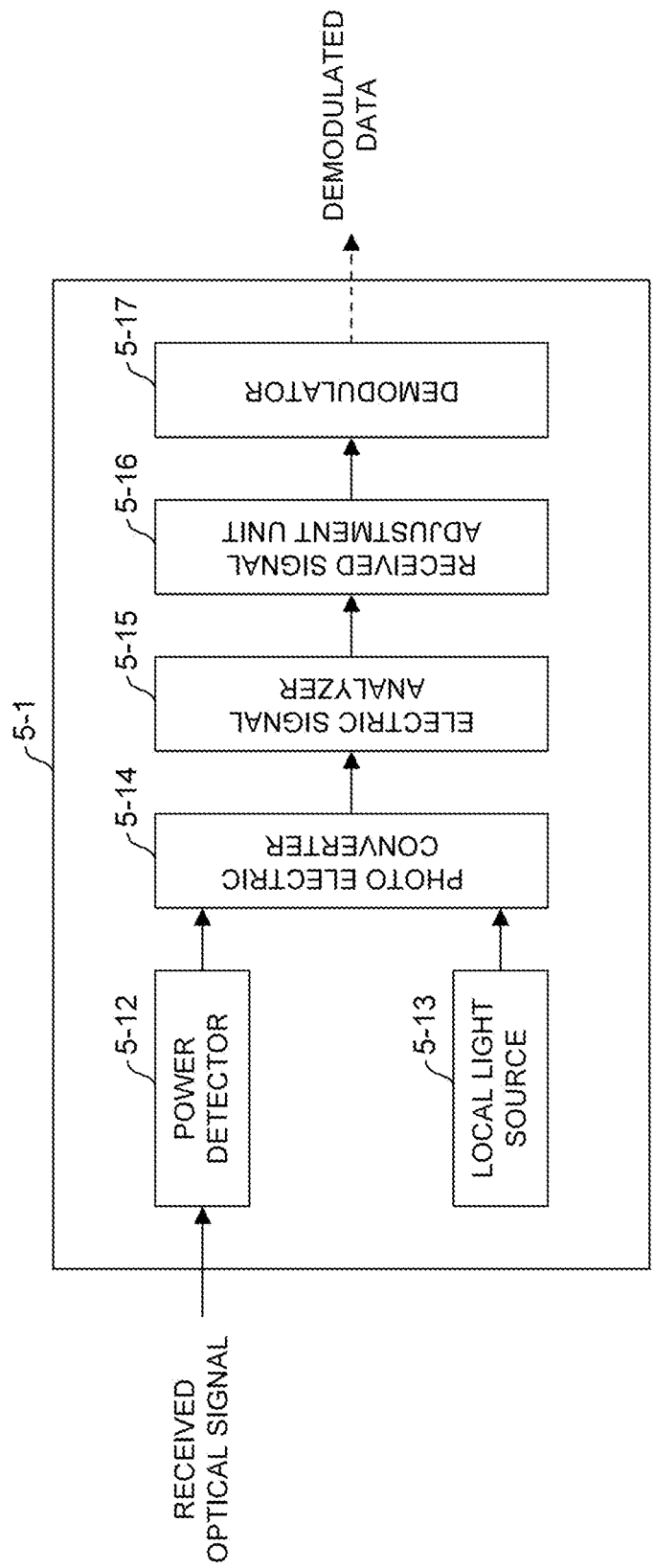
FIG. 3 is a diagram depicting a configuration example of an optical receiver relating to the first embodiment.

FIG. 3 is a diagram illustrating a configuration of the optical receiver 5-1 included in the optical receiver 5. Note that the other optical receivers 5-2 to 5-N also employ the same configuration. The optical receiver 5-1 includes a power detector 5-12, a local light source 5-13, a photoelectric converter 5-14, an electric signal analyzer 5-15, a received signal adjustment unit 5-16, and a demodulator 5-17. At a point of time of an input to the optical receiver, the power detector 5-12 measures optical power from a received optical signal as needed. The received optical signal and local light from the local light source 5-13 are both input to the photoelectric converter 5-14, and the photoelectric converter 5-14 converts optical beat component of the received optical signal and the local light into analog or digital electric signals.

The electric signal analyzer 5-15 measures signal power and a Signal-to-Noise Ratio (SNR) from the detected electric signal as needed. For example, the signal power is calculated from a square mean of the electric signal, and the SNR or an Optical Signal-to-Noise ratio (OSNR) is calculated from the detected electric signal. A method for calculating the SNR at a stage before the received signal adjustment unit 5-16 is generally a method for obtaining a ratio of signal power and a noise level (a floor value of a spectrum) from the spectrum of the detected electric signal. The SNR is defined as the signal-to-noise ratio per 1 Hz in bandwidth, and consequently can be converted into the OSNR, which is defined in a noise bandwidth per 12.5 GHz, by being multiplied with an appropriate coefficient.

The detected electric signal is input to the received signal adjustment unit 5-16, and the received signal adjustment unit 5-16 cancels a distortion component included in the signal as needed. Processing examples of the received signal adjustment unit 5-16 include clock recovery, frequency offset compensation, polarization division, and phase noise cancellation, which are described in Non-Patent Literatures 2 and 3. The demodulator 5-17 performs demodulation processing on the electric signal from which distortion has been cancelled by the received signal adjustment unit 5-16, and outputs a processing result to an unillustrated external function or processing as needed.

Figure 4:
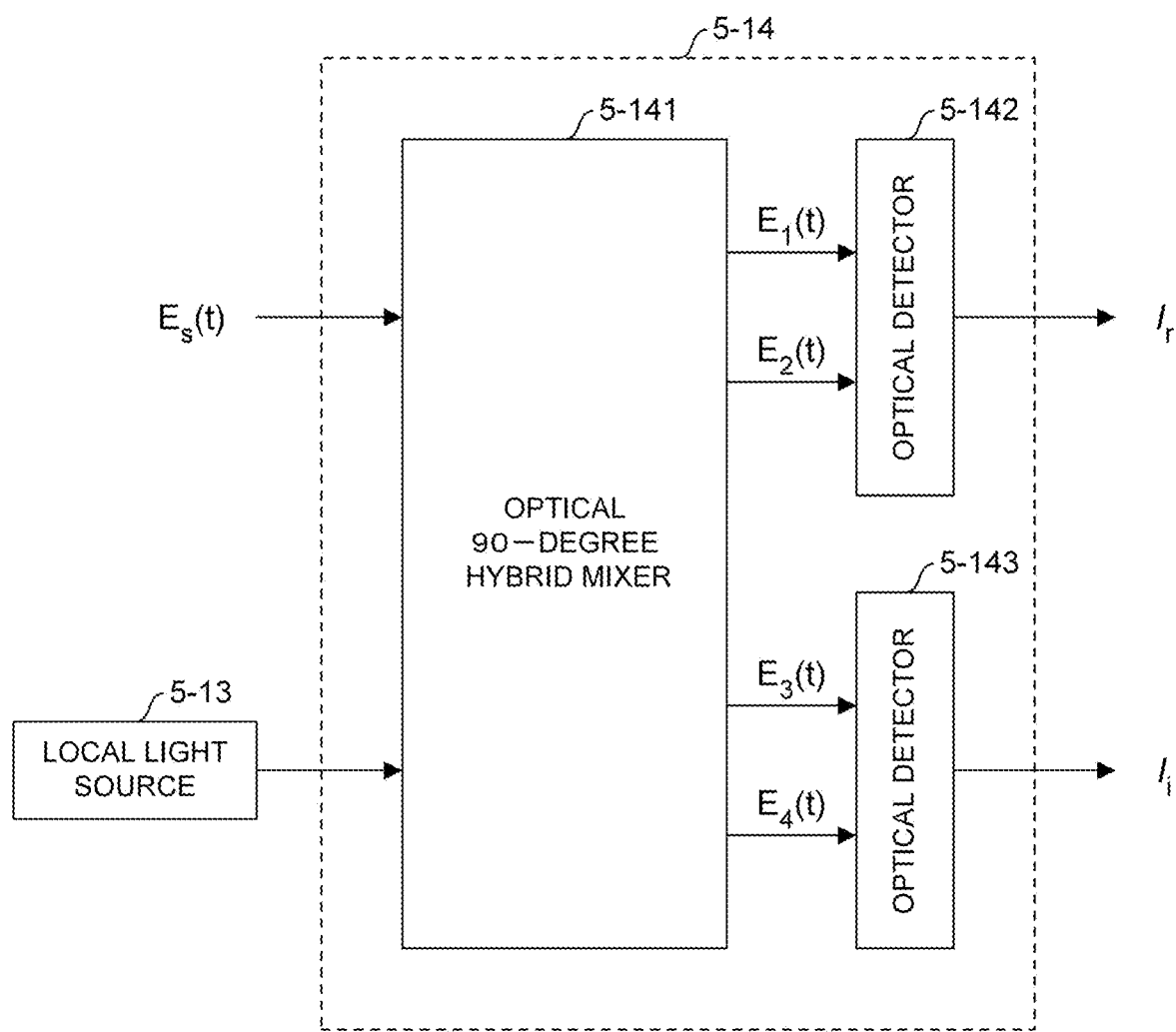
FIG. 4 is a diagram depicting a configuration example of a photoelectric converter.

Next, a configuration example of the photoelectric converter 5-14 assumed to derive a mathematical formula described below will be described with reference to FIG. 4. The photoelectric converter 5-14 includes an optical 90-degree hybrid mixer 5-141, an optical detector 142, and an optical detector 5-143. An input optical signal $E_s(t)$ (i.e. signal electric field) is incident on the optical 90-degree hybrid mixer 5-141 together with the continuous light (i.e. local light) output from the local light source 5-13. The optical 90-degree hybrid mixer 5-141 outputs to each of the optical detectors 5-142 and 5-143 a synthesis (beat) component of the input light and the continuous light whose phases are different by 90 degrees. The optical detector 5-142 and the optical detector 5-143 respectively convert the received beat light into electric signals $I_r$ and $I_i$ corresponding to a real part and an imaginary part.

[As for Process of Deriving Mathematical Formula for Calculating Bit Error Ratio (BER)]

Calculation in the optical interference estimation unit 6-4 is performed according to a mathematical formula obtained after a deriving process described below.

Hereinafter, a case will be assumed where a signal electric field $E_s(t)$ expressed by expression (1), and the local light $E_L(t)$ expressed by expression (2) are input to the optical receiver 5. This example targets at a single polarization signal or a single polarization component of a polarization multiplexing signal.

[Expression 1]

$$E_s(t) = A_s(t)\exp\{i[\omega_s t + \theta_s(t)]\} \quad (1)$$

[Expression 2]

$$E_L(t) = A_L\exp\{i[\omega_L t + \theta_L(t)]\} \quad (2)$$

In this regard, $A_s(t)$ represents an amplitude of a signal, $\theta_s(t)$ represents a phase of the signal, $\omega_s$ represents an optical frequency of the signal, $A_L$ represents an amplitude of local light, $\theta_L(t)$ represents a phase of the local light, and $\omega_L$ represents an optical frequency of the local light.

In a case where N interference components are added to a signal, a signal electric field $E_{s,in}(t)$ influenced by crosstalk is expressed as follows.

[Expression 3]

$$E_{s,in}(t) = E_s(t) + \sum_{i=1}^{N} E_{XT,i}(t) = E_s(t) + \sum_{i=1}^{N} [A_{XT,i}(t)\exp\{i[\omega_{XT,i} t + \theta_{XT,i}(t)]\}] \quad (3)$$

In this regard, $E_{XT,i}$ represents an electric field of an i-th interference component (i.e. crosstalk), $A_{XT,i}$ represents an amplitude of the i-th interference component, $\theta_{XT,i}$ represents a phase of the i-th interference component, and $\omega_{XT,i}$ represents an optical frequency of the i-th interference component. Furthermore, assume that the signal and the interference component are each independent.

Furthermore, in a case where the configuration example of the photoelectric converter 5-14 is the configuration illustrated in FIG. 4, outputs of the optical 90-degree hybrid mixer 5-141 are each as follows.

[Expression 4]

$$E_1(t) = \frac{1}{2}[E_{s,in}(t) + E_L(t)] \quad (4)$$

[Expression 5]

$$E_2(t) = \frac{1}{2}[E_{s,in}(t) - E_L(t)] \quad (5)$$

[Expression 6]

$$E_3(t) = \frac{1}{2}[E_{s,in}(t) + iE_L(t)] \quad (6)$$

[Expression 7]

$$E_4(t) = \frac{1}{2}[E_{s,in}(t) - iE_L(t)] \quad (7)$$

In a case where loss of a coherent front end is $L_E$, and a light reception rate is put as Ra, expressions (4) to (7) after photoelectric conversion are as follows.

[Expression 8]

$$I_1(t) = Ra \cdot Re\left[\left|\frac{1}{\sqrt{L_E}}E_1(t)\right|^2\right] = \frac{Ra}{4L_E} \cdot Re\left\{\left|E_s(t) + \sum_{i=1}^{N} E_{XT,i}(t) + E_L(t)\right|^2\right\} \quad (8)$$

[Expression 9]

$$I_2(t) = Ra \cdot Re\left[\alpha\left|\frac{1}{\sqrt{L_E}}E_2(t')\right|^2\right] = \frac{\alpha Ra}{4L_E} \cdot Re\left\{\left|E_s(t') + \sum_{i=1}^{N} E_{XT,i}(t') - E_L(t')\right|^2\right\} \quad (9)$$

-continued

[Expression 10]

$$I_3(t) = Ra \cdot Re\left[\left|\frac{1}{\sqrt{L_E}}E_3(t)\right|^2\right] = \frac{Ra}{4L_E} \cdot Re\left\{\left|E_s(t) + \sum_{i=1}^{N} E_{XT,i}(t) + iE_L(t)\right|^2\right\} \quad (10)$$

[Expression 11]

$$I_4(t) = Ra \cdot Re\left[\alpha\left|\frac{1}{\sqrt{L_E}}E_4(t')\right|^2\right] = \frac{\alpha Ra}{4L_E} \cdot Re\left\{\left|E_s(t) + \sum_{i=1}^{N} E_{XT,i}(t') - iE_L(t')\right|^2\right\} \quad (11)$$

By using expressions (8) to (11), the outputs of the photoelectric converter 5-14, which corresponds to balance light detection, are expressed by respective following expressions. Assuming an ideal coherent receiver, a=1, $L_E$=1, τ=0, and t=t' are put here.

[Expression 12]

$$I_r(t) = I_1(t) - I_2(t) \quad (12)$$

$$\cong \frac{Ra}{4} \cdot Re\left[2E_s(t) \cdot E_L^*(t) + 2E_L(t) \times \sum_{i=1}^{N} E_{IN}(t) + 2E_L(t) \cdot E_S^*(t) + 2E_L(t) \times \sum_{i=1}^{N} E_{XT}^*(t)\right]$$

$$= Ra \times \{A_s(t)A_L\cos[\omega_s t + \theta_s(t) - \omega_L t - \theta_L(t)] + A_L \times \sum_{i=1}^{N} A_{XT,i}(t)\cos[\omega_{XT,i}t + \theta_{XT,i}(t) - \omega_L t - \theta_L(t)]\}$$

[Expression 13]

$$I_i(t) = I_3(t) - I_4(t) \quad (13)$$

$$\cong \frac{Ra}{4} \cdot Re\left[2E_s(t) \cdot E_L^*(t) + 2iE_L(t) \times \sum_{i=1}^{N} E_{IN}(t) + 2iE_L(t) \cdot E_S^*(t) + 2iE_L(t) \times \sum_{i=1}^{N} E_{XT}^*(t)\right]$$

$$= Ra \times \{A_s(t)A_L\sin[\omega_s t + \theta_s(t) - \omega_L t - \theta_L(t)] + A_L \times \sum_{i=1}^{N} A_{XT,i}(t)\sin[\omega_{XT,i}t + \theta_{XT,i}(t) - \omega_L t - \theta_L(t)]\}$$

Note that * of E*(t) represents a complex conjugate. In the deriving processes of expressions (12) and (13), a direct current component cancelled by the coherent receiver, and a beat component among crosstalks having little influence were ignored.

In this regard, assuming an M-level phase modulation signal, $A_s(t)$=1, $\theta_3(t) \in \{\pi/M, 3\pi/M, 5\pi/M, \ldots, (2M-1)/M\}$ hold. Moreover, assuming waveform distortion equalization by ideal digital signal processing in the received signal adjustment unit 5-16, $\omega_s-\omega_L$=0 and $\theta_L(t)$=0 are put for the signal component.

[Expression 14]

$$I_r(t) \cong Ra \cdot A_L \times \left\{\cos\theta_s(t) + \sum_{i=1}^{N} A_{XT,i}(t)\cos[\omega_{XT,i}t + \theta_{XT,i}(t) - \omega_L t - \theta_L(t) - \theta_{s'}(t)]\right\} \quad (14)$$

[Expression 15]

$$I_i(t) \cong Ra \cdot A_L \times \left\{\sin\theta_s(t) + \sum_{i=1}^{N} A_{XT,i}(t)\sin[\omega_{XT,i}t + \theta_{XT,i}(t) - \omega_L t - \theta_L(t) - \theta_{s'}(t)]\right\} \quad (15)$$

In this regard, $\theta_s(t)$ represents phase rotation caused by waveform distortion compensation. A term of the phase that the crosstalk has in the second term is a product of frequency rotation and random-walk phase fluctuation, and therefore can be regarded as a uniform distribution of a range [−π, π]. Hence, in a case where an amplitude of an i-th crosstalk component is put as y, a distribution thereof can be expressed by a following expression.

[Expression 16]

$$p_i(y) = \frac{1}{\pi A_{XT,i}^2 \sqrt{1 - \left(\frac{y}{A_{XT,i}}\right)^2}}, \quad |y| < A_{XT,i}^2 \quad (16)$$

Thus, an amplitude distribution of a certain crosstalk can be regarded as a sine function (arc sine function). Plural crosstalks influence each other in expressions (14) and (15), and therefore expression (16) is expanded to N crosstalks. In a case where each crosstalk is not correlated and is independent, a characteristic function $M_{XT}(s)$ of a distribution of each crosstalk is expressed by a following expression.

[Expression 17]

$$M_{XT}(s) = \prod_{i=1}^{N} J_0(2sA_{XT,i}) \quad (17)$$

Here, s represents a conversion variable (for which s>0 holds, and that is also referred to as an independent variable) at a time when the amplitude of the crosstalk, which is expressed on the time axis, is linearly mapped, and $J_0(\cdot)$ represents a 0th order modified Bessel function.

Next, a BER is calculated using a feature of expression (17). It is assumed that the real part and the imaginary part are independent, and derivation indicates the BER of one component of either the real part or the imaginary part.

[Expression 18]

$$BER = p_0 \cdot Pr[D_1 \geq Z > D_2|0] + p_1 \cdot Pr[E_1 < Z \leq E_2|1] \quad (18)$$

In this regard, $D_1$, $D_2$, $E_1$, and $E_2$ (where $D_1 > D_2$ and $E_1 < E_2$ hold) represent determination thresholds, $p_0$ represents an occurrence probability of a bit 0, $p_i$ represents an occurrence probability of a bit 1, and Pr[•] is a probability density function with respect to a probability variable Z.

A noise component is Z=X+Y, X represents a distribution $p_x(u)$ of distortion due to the crosstalk, and Y represents noise of other additive white Gaussian processes. In this regard, assuming Y to N(μ, $\sigma^2$), the amplitude of the crosstalk is μ. Moreover, $\sigma^2$ represents variance of the additive white Gaussian noise. Since X and Y are independent, expression (18) can be modified to a following expression.

$$BER = p_0 \int_{-\infty}^{\infty} p_{X|0}(u) \cdot Pr[(D_1 - u) \geq Y > (D_2 - u)|0] \cdot du + \qquad (19)$$

$$p_0 \int_{-\infty}^{\infty} p_{X|1}(u) \cdot Pr[(E_1 - u) < Y \leq (E_2 - u)|0] \cdot du$$

To solve expression (19), a following expression associated with the first term will be considered first.

[Expression 20]

$$Pr[D_1 \geq Z > D_2 | 0] = p(D_1 \geq X + Y > D_2) = \qquad (20)$$

$$\int_{-\infty}^{\infty} p_{X|0}(u) du \cdot \frac{1}{\sigma\sqrt{2\pi}} \times \int_{D_2 - u}^{D_1 - u} e^{-\frac{y^2}{2\sigma^2}} dy$$

By introducing the arbitrary variable s and using non-negativeness $(z-s\sigma^2)^2 \geq 0$ of a square difference, a following relational formula is derived.

[Expression 21]

$$\int_{D_2-u}^{D_1-u} e^{-\frac{y^2}{2\sigma^2}} \cdot dy \leq -\frac{1}{s} e^{-\frac{s\sigma^2}{2}} \cdot e^{-s(D_1-u)} + \frac{1}{s} e^{-\frac{s\sigma^2}{2}} \cdot e^{-s(D_2-u)} \qquad (21)$$

By using the relationship in expression (21), an upper limit of expression (20) can be described by the following expression.

[Expression 22]

$$p(D_1 \geq X + Y > D_2) \leq \qquad (22)$$

$$\frac{1}{s\sigma\sqrt{2\pi}} \left( e^{\frac{s^2\sigma^2}{2}} \cdot e^{-sD_2} - e^{\frac{s^2\sigma^2}{2}} \cdot e^{-sD_1} \right) \times \int_{-\infty}^{\infty} p_{X|0}(u) e^{su} \cdot du$$

An integral term of expression (22) corresponds to a definition formula of the characteristic function that uses the conversion variable s. To rewrite expression (22), a characteristic function of an interference component for a transmission bit $b \in \{0, 1\}$ is a following expression similar to expression (17).

[Expression 23]

$$M_{X|b}(s) = \prod_{i=1}^{N} J_0(2s A_{XT|b,i}) \qquad (23)$$

By substituting expression (23) into expression (22), a probability that a received symbol exceeds a threshold in a case where the bit 0 is transmitted is finally given by a following expression.

[Expression 24]

$$Pr[D_1 \geq Z > D_2|0] \leq \frac{1}{s\sigma\sqrt{2\pi}} e^{\frac{s^2\sigma^2}{2}} \left( e^{-sD_2} - e^{-sD_1} \right) \times M_{X|0}(s) \qquad (24)$$

Similarly, a probability that a received symbol exceeds the threshold in a case where the bit 1 is transmitted is the following expression.

[Expression 25]

$$Pr[E_1 < Z \leq E_2|1] \leq \frac{1}{s\sigma\sqrt{2\pi}} e^{\frac{s^2\sigma^2}{2}} \left( e^{-sE_1} - e^{-sE_2} \right) \times M_{X|1}(s) \qquad (25)$$

In a case where $p_0 = p_1 = 0.5$ is put, a final formula for an upper limit of the BER becomes a following expression.

[Expression 26]

$$BER \leq \min_s \left\{ \frac{1}{2s\sigma\sqrt{2\pi}} e^{\frac{s^2\sigma^2}{2}} \times \qquad (26) \right.$$

$$\left. \left[ \left( e^{-sD_2} - e^{-sD_1} \right) \cdot M_{X|0}(s) + \left( e^{-sE_1} - e^{-sE_2} \right) \cdot M_{X|1}(s) \right] \right\}$$

Although this example assumes the four determination thresholds, there may be also four or more determination thresholds depending on a modulation method. Hereinafter, a BER under an environment where N interference components exist is derived citing a Binary Phase Shift Keying (BPSK) signal and a Quadrature Phase Shift Keying (QPSK) signal as examples. Assuming that additive white Gaussian noise of the same variance is added to each symbol, an optimal determination threshold condition is $D_1 = \infty$, $D_2 = 0$, $E_1 = 0$, and $E_2 = \infty$ hold. Consequently, expression (26) can be modified to the following expression.

[Expression 27]

$$BER_{BPSK/QPSK} \leq \qquad (27)$$

$$\min_s \left\{ \frac{1}{2s\sigma\sqrt{2\pi}} e^{\frac{s^2\sigma^2}{2}} \times \left\{ e^{sV} \cdot E[M_{X|0}(s)] + e^{-sV} \cdot E[M_{X|1}(s)] \right\} \right\}$$

In this regard, V represents a voltage value (more accurately, an average voltage value of each symbol) at a time when each symbol is received, and it is assumed that an absolute value of the voltage value is equal between the bit 0 and the bit 1.

A characteristic function of interference components in expression (27) is an expected value of a combination of the N interference components, and is expressed by the following expressions.

[Expression 28]

$$E[M_{X|0}(s)] = \left(\frac{1}{2}\right)^N \times \sum_{i=0}^{N} \left\{ \binom{N}{i} \cdot \prod_{k=1}^{i} \left[ \frac{-1 - J_0(2s A_{XT,k})}{2} \right] \right\} \qquad (28)$$

[Expression 29]

$$E[M_{X|1}(s)] = \left(\frac{1}{2}\right)^N \times \sum_{i=0}^{N} \left\{ \binom{N}{i} \cdot \prod_{k=1}^{i} \left[ \frac{1 + J_0(2s A_{XT,k})}{2} \right] \right\} \qquad (29)$$

In this regard, vertical writing of (N i) represents a combination obtained by selecting i interference components from the N interference components, and is generally referred to as a binomial coefficient.

A case is assumed at a time of deriving where symbol −1 is allocated to the bit 0, and symbol 1 is allocated to the bit 1. Each BER of the imaginary part and the real part has been independently considered. In a case of BPSK, only one axis of the imaginary part and the real part needs to be considered, and accordingly noise power becomes relatively half with respect to signal power. The real part and the imaginary part of the BERs of QPSK are independently handled. Hence, the BERs are expressed by the following expressions.

[Expression 30]

$$BER_{BPSK} \leq \min_{s} \left\{ \frac{1}{2s\sigma\sqrt{2\pi}} e^{\frac{s^2\sigma^2}{2}} \times \{e^{sV} \cdot E[M_{X|0}(s)] + e^{-sV} \cdot E[M_{X|1}(s)]\} \right\} \quad (30)$$

[Expression 31]

$$BER_{Total\_QPSK} \leq \min_{s} \left\{ \frac{1}{2s\sigma\sqrt{2\pi}} e^{\frac{s^2\sigma^2}{2}} \times \{e^{sV} \cdot E[M_{X|0}(s)] + e^{-sV} \cdot E[M_{X|1}(s)]\} \right\} \quad (31)$$

On the other hand, the BERs in a case where Gaussian approximation used by a conventional technique is used are expressed by the following expressions.

[Expression 32]

$$BER_{GA\_BPSK} \cong \left(\frac{1}{2}\right)^{N+1} \sum_{k=0}^{N} \left\{ \binom{N}{k} \cdot Q\left[\frac{V}{\sqrt{\sigma^2/2 + N \cdot \sigma_x^2}}\right] + \binom{N}{k} \cdot W\left[\frac{-V}{\sqrt{\sigma^2/2 + N \cdot \sigma_x^2}}\right] \right\} \quad (32)$$

[Expression 33]

$$BER_{GA\_Total\_QPSK} \cong \left(\frac{1}{2}\right)^{N+1} \sum_{k=0}^{N} \left\{ \binom{N}{k} \cdot Q\left[\frac{V}{\sqrt{\sigma^2 + N \cdot \sigma_x^2}}\right] + \binom{N}{k} \cdot Q\left[\frac{-V}{\sqrt{\sigma^2 + N \cdot \sigma_x^2}}\right] \right\} \quad (33)$$

In this regard, $Q(\bullet)$ represents a Q function, and $\sigma_x^2$ represents an expected value of variance of an interference component (i.e. crosstalk).

While, in the present embodiment, the crosstalk is mapped on the independent variable axis s that is different from the time axis t, and an accurate upper limit value of the BER is calculated using a product (e.g. expressions (23), (28), and (29)) of a sine wave distribution (also referred to as an arc sine distribution) formed by a sum of amplitudes of crosstalks based on non-negativeness $(z-s\sigma^2)^2 \geq 0$ of a square of a difference between a product of the independent variable and variance of additive white Gaussian noise and total noise, the conventional technique simply approximates crosstalk to an appropriate Gaussian distribution, and calculates the BER.

Note that linear mapping of an arbitrary function f(v) expressed by a certain variable v on the independent variable s is defined by the following expression in the present embodiment.

[Mathematical 34]

$$M(s) = \int_{-\infty}^{\infty} f(v) e^{sv} dv \quad (34)$$

Thus, mapping is performed assuming the sine wave distribution. Note that, in a case where calculation is performed using the above-described BER calculation formula, the value of the independent variable s is changed such that the BER value becomes minimum.

Effect of Present Embodiment

Figure 5:
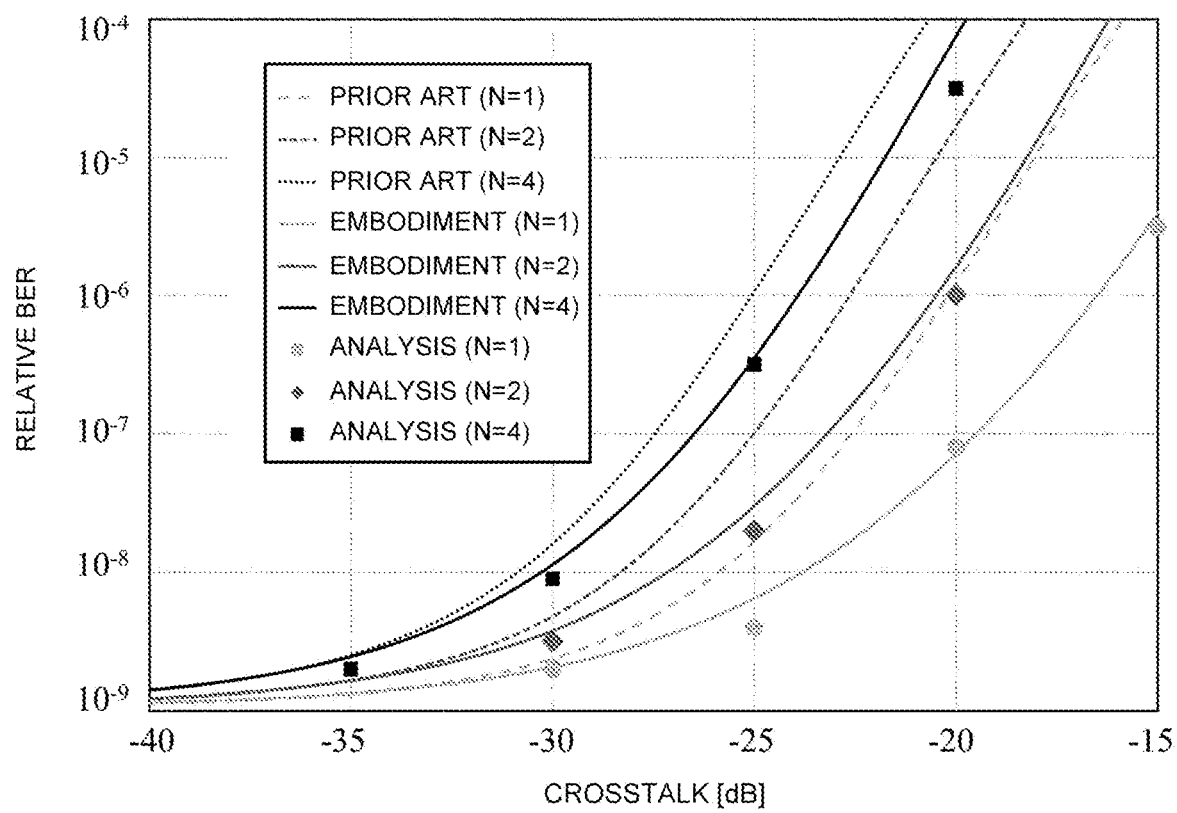
FIG. 5 is a diagram to explain an effect of the embodiment.

FIG. 5 illustrates results of relative BERs with respect to crosstalk (a square mean of amplitudes of leaking light here) [dB] plotted per conventional technique, present embodiment, and analysis. The relative BER means a BER obtained at an SNR required when BER=$10^{-9}$ is obtained in a state without crosstalk, and does not directly correspond to the BER calculated by expressions (28) to (33). For convenience of description, SNRs resulting from additive white Gaussian noise are fixed to specific values under all conditions in FIG. 5. Moreover, as is understood from expressions (28) to (31), an influence of deterioration caused by the interference component does not change between BPSK and QPSK, and therefore FIG. 5 targets at only QPSK. It is possible to confirm that the present embodiment and an analysis result match very well. On the other hand, the conventional technique obtains a higher BER than that of the analysis in an area where the number of crosstalks is small or a crosstalk amount is large.

Figure 6:
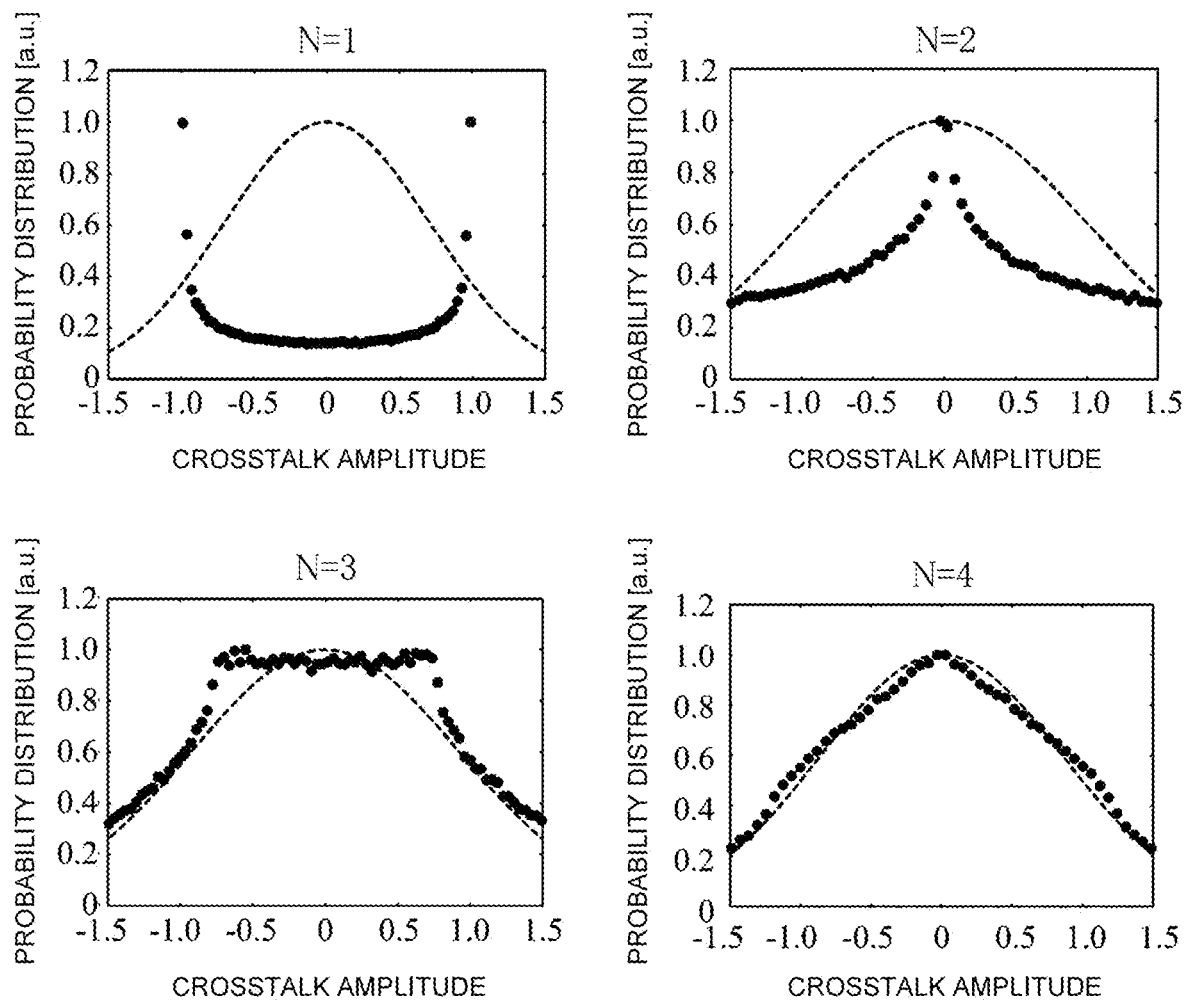
FIG. 6 is a diagram depicting crosstalk characteristics in a prior art.

FIG. 6 illustrates results obtained by calculating probability distributions with respect to crosstalk amplitudes in a case where the conventional technique is applied. In FIG. 6, the number of crosstalks N is changed from one to four, and dotted lines indicate the conventional technique and circles indicate the analysis result. Focusing on, for example, a result of N=1, the conventional technique and the analysis result represent greatly different trends. While the crosstalk amplitude has a property of a sine function (also referred to as an arc sine function) expressed by expression (16), the conventional technique performs Gaussian approximation on the crosstalk, and therefore an influence of the crosstalk causes divergence from analysis. That is, this means that, even though a distribution of the sine function originally has little influence on the BER, the distribution is regarded as a Gaussian distribution, and thereby excessive deterioration is estimated.

Figure 7:
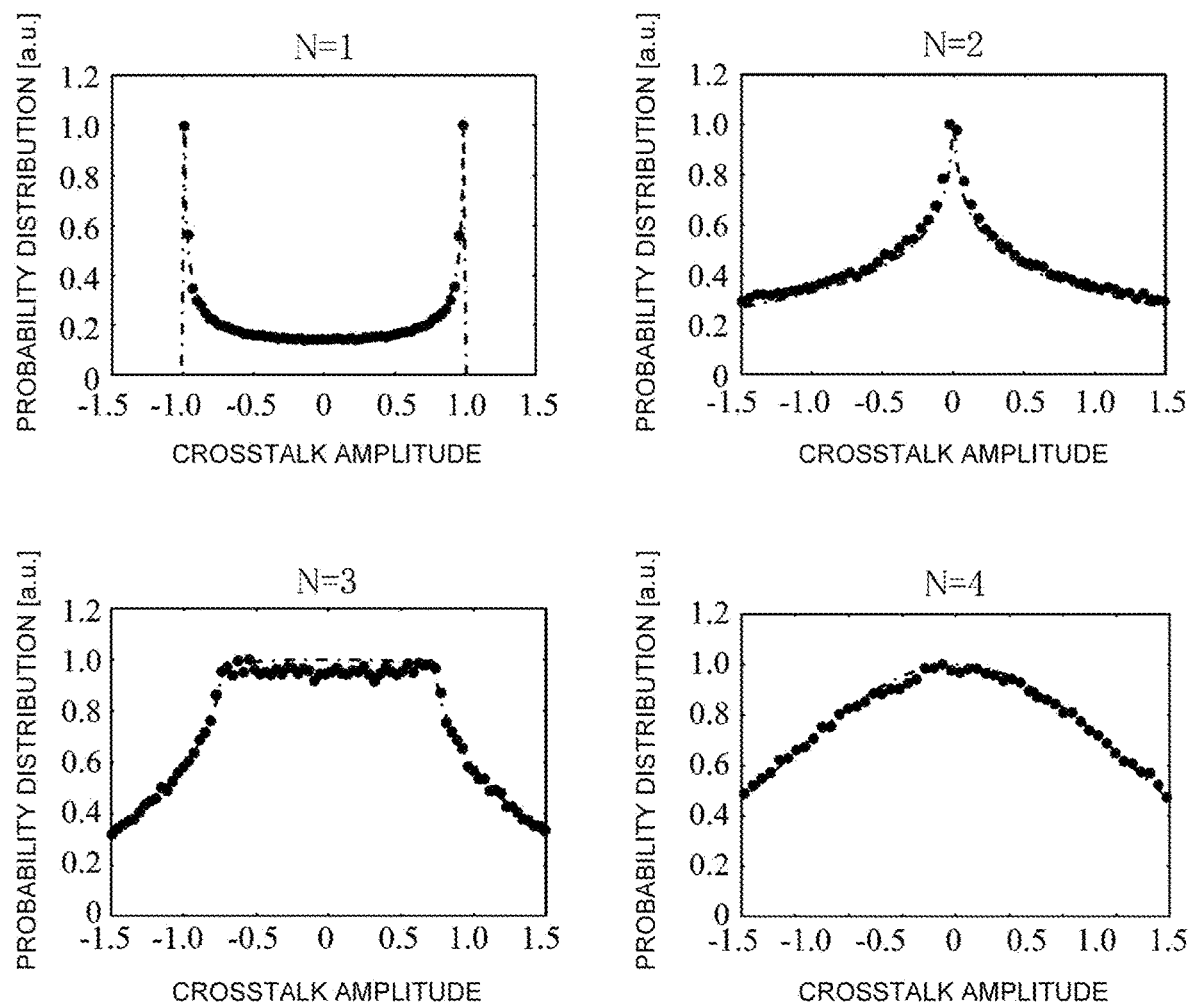
FIG. 7 is a diagram depicting crosstalk characteristics in the embodiment.

FIG. 7 illustrates results obtained by calculating probability distributions with respect to crosstalk amplitudes in a case where the present embodiment is applied. Similar to FIG. 6, in FIG. 7, the number of crosstalks N is changed from one to four, and dashed-dotted lines represent the present embodiment and circles represent the analysis result. At any number of crosstalks, both of the dashed dotted line and the circle represent the matching probability distribution. This suggests that expressions (28) and (29) calculated in the present embodiment can accurately express actual distributions. However, also according to the conventional technique, as the number of crosstalks N increases, the probability distribution becomes close to a Gaussian shape. That is, if a penalty is permitted to some degree, there may be a case where the conventional technique is applicable when N is four or more. This trend can be also confirmed from FIG. 5, and it is possible to confirm that a difference between the conventional technique and the present embodiment is relatively little at N=4.

[As for Function of Optical Interference Estimation Unit 6-4]

The optical interference estimation unit 6-4 estimates an influence of the crosstalk from, for example, derived expressions (28) to (31). Details of the function of the optical interference estimation unit 6-4 will be described below. In a case where the SNR and each crosstalk amplitude are known, it is possible to estimate an accurate BER according to, for example, expressions (28) to (31). Note that, although there is also a case where an average value of crosstalk amplitudes can be obtained, each crosstalk amplitude is handled assuming that each crosstalk amplitude has the same value in this case.

Although the above example assumes that the SNR and each crosstalk amplitude are known, a measurement result may be applied in a case where the SNR and each crosstalk amplitude are unknown. In, for example, the optical transmission system in which the first controller 6-1, the second controller 6-2, and the third controller 6-3 can operate in cooperation, an absolute value of a crosstalk amplitude is calculated from a square root of a difference between optical power measured by the power detector 1-1-3 and optical power measured by the power detector 5-12 for each route in the transmission line 3.

Furthermore, the SNR or the OSNR may be calculated from an output of the electric signal analyzer 5-15 using a method disclosed in Patent Literature 2 or the like. For accuracy, variance $\sigma^2$ of additive white Gaussian noise is estimated, however, when an electric signal observed by the received signal adjustment unit 5-16 is normalized such that an absolute value of the amplitude of the electric signal becomes one, the variance $\sigma^2$ of the additive white Gaussian noise is a reciprocal of the SNR. Hereinafter, taking this as a premise, description will be made assuming that the variance $\sigma^2$ of the additive white Gaussian noise can be easily calculated from a known SNR or OSNR. By applying these measurement values to expressions (28) to (31), it is possible to obtain a result of the same contents as that illustrated in FIG. 5. On the contrary, in a case where the BER is known, it is possible to calculate backward the SNR and each crosstalk amplitude or an average value of the crosstalk amplitudes according to, for example, expressions (28) to (31). Similarly at this time, in a case where one of the crosstalk amplitude and the SNR is unknown, one of the crosstalk amplitude and the SNR may be measured by the above-described method.

Thus, according to the present embodiment, it is possible to accurately indicate signal quality represented by a bit error rate, the variance $\sigma^2$ of the additive white Gaussian noise, the SNR or the OSNR, and each crosstalk amplitude or an average value of the crosstalk amplitudes.

Moreover, a processing result of the optical interference estimation unit 6-4 may be fed back to the optical sender 1 to perform control of efficiently operating the optical transmission system. In a case where the SNR and each crosstalk amplitude or an average value of the crosstalk amplitudes are known, the optical interference estimation unit 6-4 can estimate the BER in advance before an optical signal is transmitted. In a case where a BER calculated with a certain modulation method exceeds a reference value, it is possible to increase a transmission capacity while keeping the BER at the reference value or less by changing a condition. A case will be assumed as an example where a coding rate and a coding method of an error correction code and a level of multiplicity modulation of the symbol can be set. Assume that, if a BER of a PSK signal is calculated at a fixed coding rate according to expressions (23) and (26) or expressions (28), (29), and (31), a calculation result exceeds the reference value. In this case, PSK having higher resistance against crosstalk deterioration is selected such that the BER becomes the reference value or less. As is understandable from, for example, expressions (28) to (31), BPSK that uses binary symbols has two-fold resistance against distortion and noise compared to QSPK that uses quadrature symbols. That is, control is performed to change the coding method to BSPK instead of QPSK.

Similar processing is also applicable to selection of the coding rate and the coding method of the error correction code. Assume that, when a coding rate and a coding method of a certain error correction code are selected, and a BER of PSK signals is calculated for a fixed level of multiplicity modulation according to expressions (23) and (26) or expressions (28), (29), and (31), a calculation result exceeds the reference value. In such a case, a coding rate and a coding method or one of them having higher error correction accuracy are selected and set such that the BER becomes the reference value or less.

Note that, although a method for selecting one of the coding rate of the error correction code, the coding method of the error correction code, and the level of multiplicity modulation of the symbol has been described above, a combination thereof may be selected.

Figure 8A:
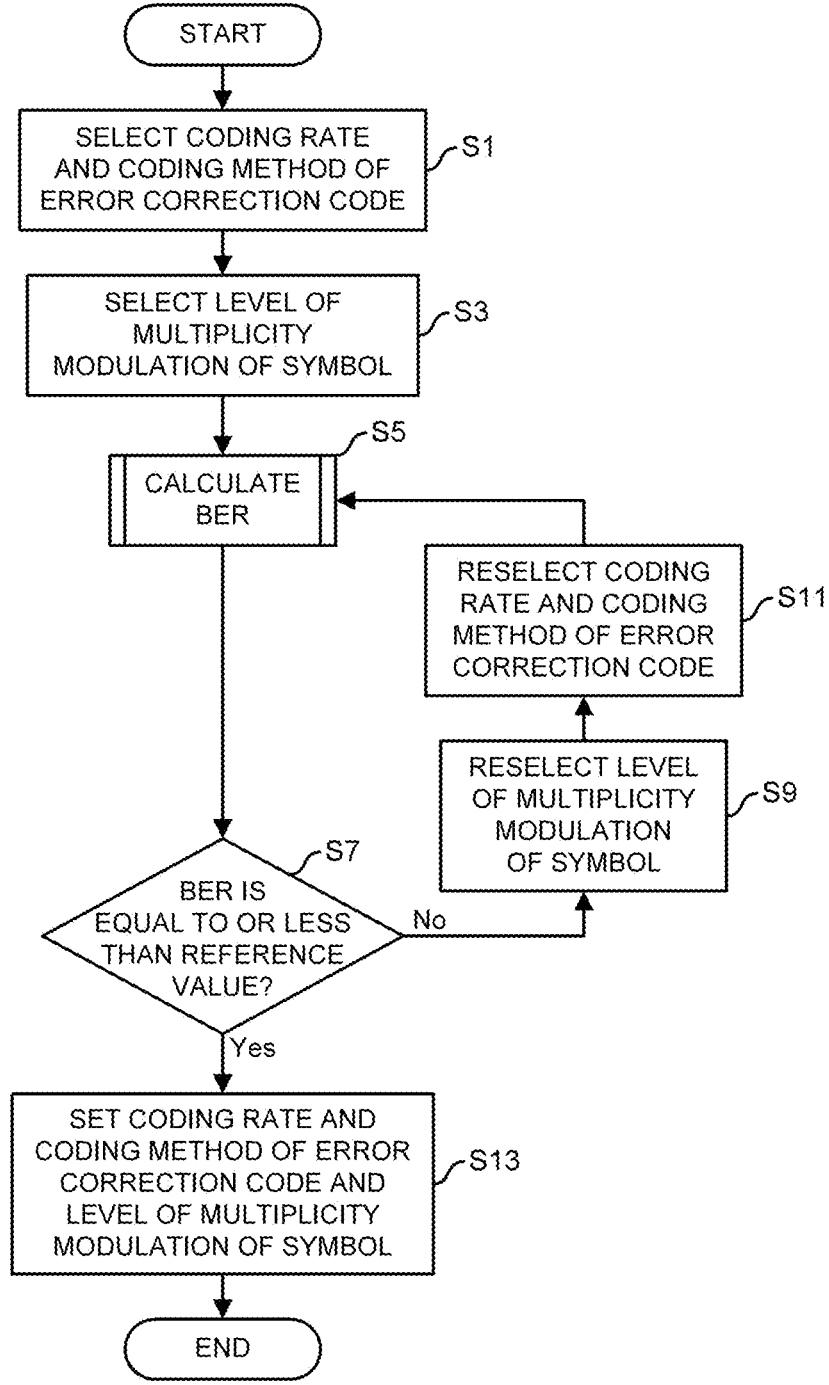
FIG. 8A is a diagram depicting a processing content of a control method relating to the first embodiment.

FIG. 8A illustrates an example of this processing procedure. First, the optical interference estimation unit 6-4 selects a coding rate and a coding method of an error correction code before transmission of a signal (step S1), and further selects a level of multiplicity modulation of the symbol (step S3). The optical interference estimation unit 6-4 calculates a BER according to expressions (23) and (26) or expressions (28) to (31) (step S5). Calculation of the BER will be more specifically described later with reference to FIG. 8C. The optical interference estimation unit 6-4 determines whether or not the calculated BER is equal to or less than the reference value (step S7). When the calculated BER is equal to or less than the reference value, the optical interference estimation unit 6-4 notifies the modulation method controller 1-1-1 of the selected coding rate, coding method, and the level of multiplicity modulation of the symbol via the first controller 6-1, and the modulation method controller 1-1-1 sets the coding rate, the coding method, and the level of multiplicity modulation of the symbol to each of the optical signal generator 1-11 to 1-1m (step S13).

On the other hand, in a case where the calculated BER exceeds the reference value, the optical interference estimation unit 6-4 reselects the level of the multiplicity modulation of the symbol (step S9). If a different level of multiplicity modulation can be selected, the different level of multiplicity modulation is selected. If the different level of multiplicity modulation cannot be selected, the same level of multiplicity modulation may be selected. Moreover, the optical interference estimation unit 6-4 reselects the coding rate and the coding method of the error correction code (step S11). When the different coding rate or coding method or both can be selected, the different coding rate and coding method are selected, and, when the different coding rate or coding method or both cannot be selected, the same coding rate and coding method are selected. Furthermore, processing returns to step S5.

By performing this processing, it is possible to perform communication using such a combination of the coding rate, the coding method of the error correction code and the level of multiplicity modulation of the symbol that the BER becomes equal to or less than the reference value. For example, in the field of optical fiber communication, it is usually intended to achieve BER=$10^{-15}$ after error correction decoding, and the reference value of the BER according to Non-Patent Literature 4 is BER<$2\times10^{-3}$. An order of steps S1 and S3 and an order of steps S9 and S11 can be rearranged. Moreover, the above processing may be performed by the first controller 6-1 and the method controller 1-1-1, or the processing may be shared by plural components. Furthermore, when even any combination of a coding rate and a coding method of an error correction code and a level of multiplicity modulation of the symbol does not make the BER the reference value or less, the reference value itself has a problem, and therefore an error may be issued.

Consequently, it is possible to accurately analyze and estimate an influence of deterioration due to the crosstalk, and reduce an extra margin and increase a transmission capacity of the optical transmission system by using the accurately estimated BER and adopting an appropriate modulation method in the optical sender 1.

Figure 8B:
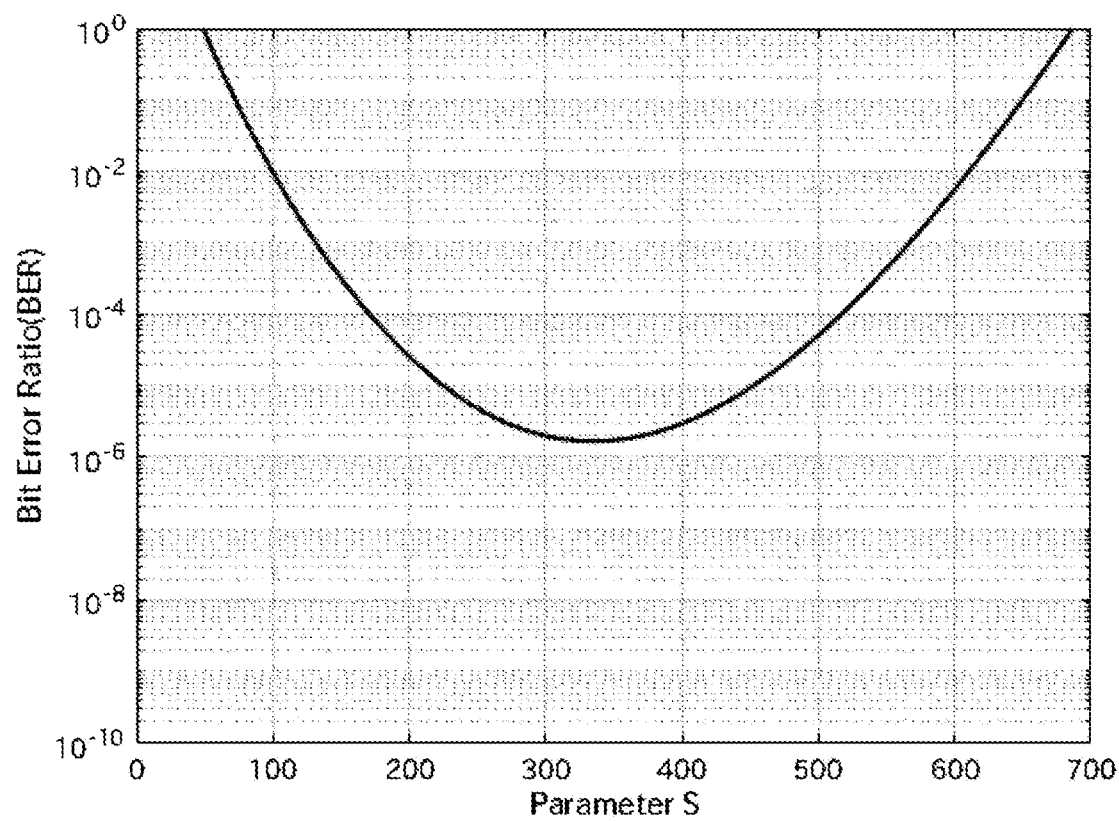
FIG. 8B is a diagram depicting an example of a relationship between an independent variable s and BER.

Next, calculation of the BER in step S5 will be described. In many cases, the relationship between the BER and the independent variable s shows a curve that protrudes downward as schematically illustrated in FIG. 8B. That is, in order to calculate the BER, a value of an expression in the parentheses on the right side in expression (26), (30), or (31) is calculated while the independent variable s is changed, and thereby a minimum value of calculated values is searched for. For example, the minimum value may be searched for in a round-robin manner in a search range of the independent variable s, or the minimum value may be searched for by a general optimization algorithm such as a steepest descent method. As illustrated in, for example, FIG. 8C, the optical interference estimation unit 6-4 sets a value to the independent variable s according to a predetermined algorithm or rule (step S101). Furthermore, the optical interference estimation unit 6-4 calculates the BER for a current value of the independent variable s according to the expression in the parentheses on the right side in expression (26), (30), or (31) (step S103). Subsequently, the optical interference estimation unit 6-4 determines whether or not a processing termination condition has been satisfied (step S105). This termination condition is, for example, an upper limit of the number of times of calculation, or may be other termination conditions determined by other optimization algorithms. In a case where the processing termination condition is not satisfied, processing returns to step S101. On the other hand, in a case where the processing termination condition has been satisfied, the optical interference estimation unit 6-4 selects as a solution the minimum value of the calculated BER values (step S107).

Figure 8C:
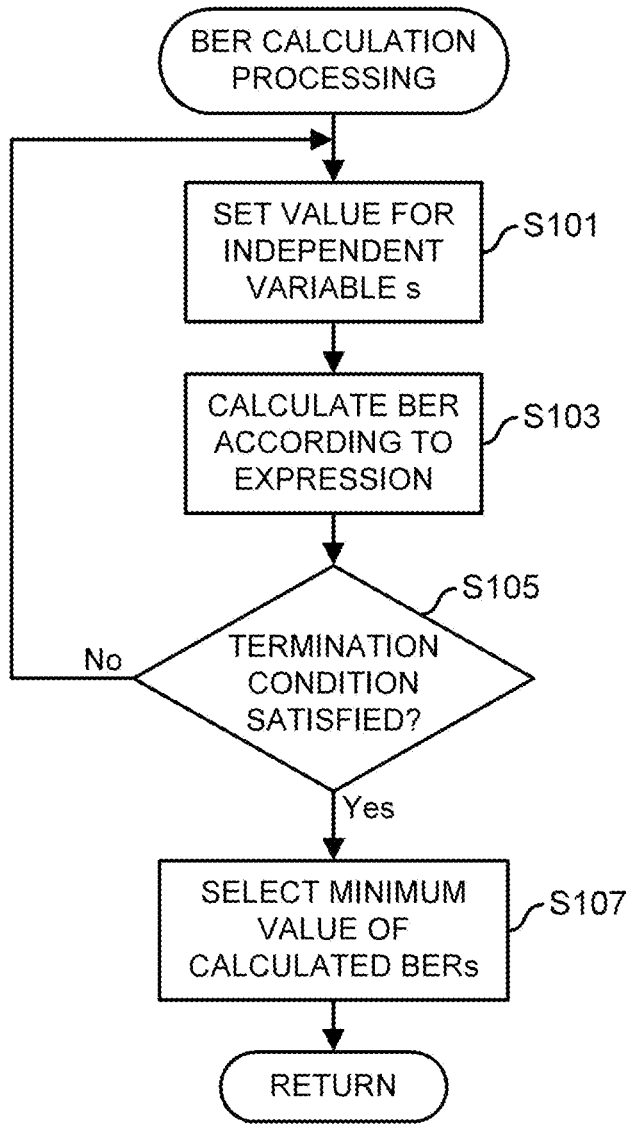
FIG. 8C is a diagram depicting an example of a search processing of a minimum value.

By performing processing illustrated in FIG. 8C or processing similar to this processing, and minimizing the value of the expression in the parentheses on the right side in expression (26), (30), or (31) while changing the independent variable s, it is possible to estimate the upper limit value of the BER of interest.

Figure 9:
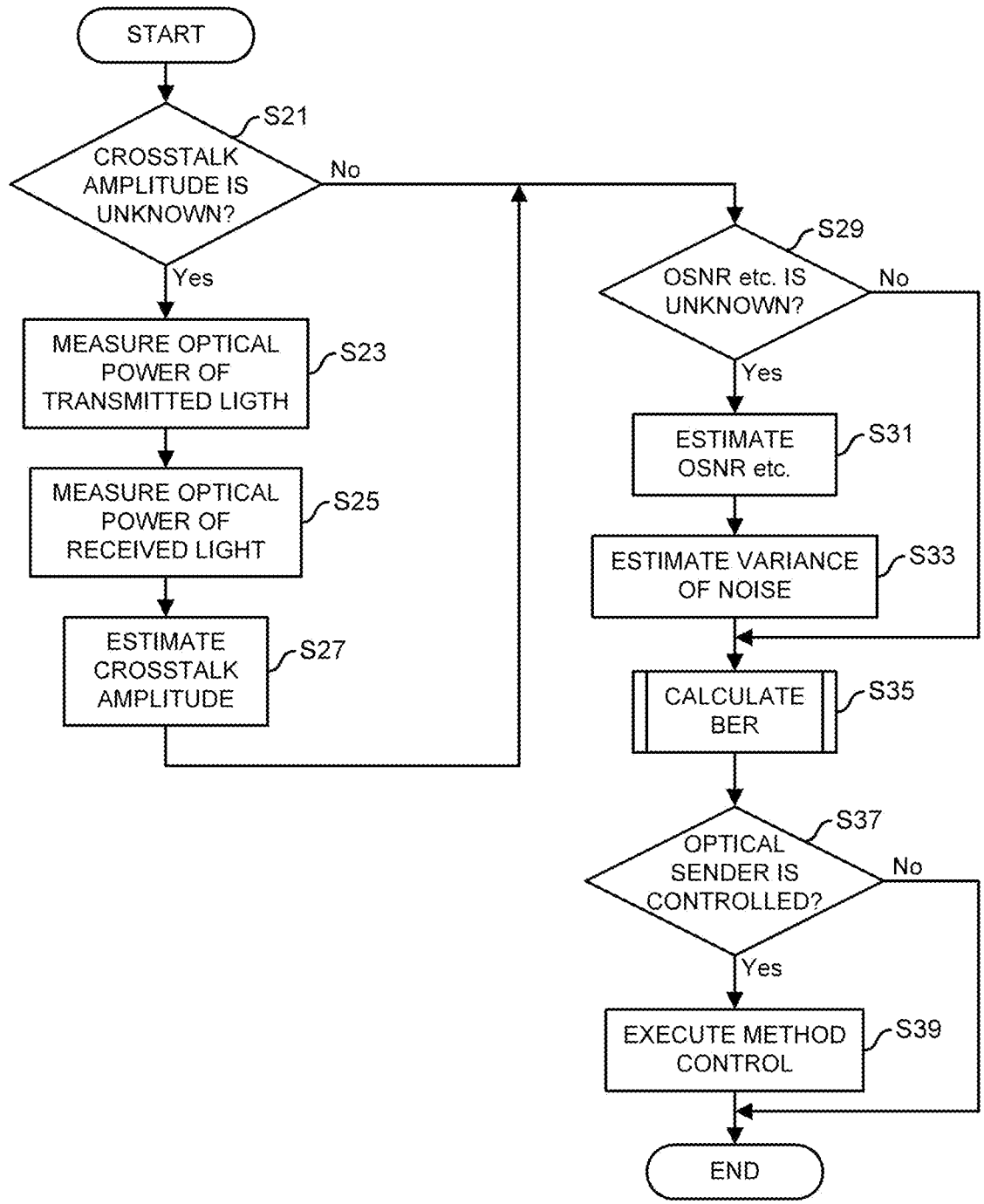
FIG. 9 is a diagram depicting a processing content in the optical transmission system relating to the first embodiment.

Moreover, an example of processing performed by the optical transmission system according to the present embodiment will be described with reference to FIG. 9. First, the optical interference estimation unit 6-4 determines whether or not each crosstalk amplitude or an average value of the crosstalk amplitudes is unknown (step S31). In a case where each crosstalk amplitude or an average value of the crosstalk amplitudes is unknown, estimation is performed using power of the optical sender 1 and the optical receiver 5. More specifically, the optical interference estimation unit 6-4 transmits a control signal to the optical sender 1 via the first controller 6-1 and to the optical receiver 5 via the third controller 6-3. The optical sender 1 having received the control signal measures optical power of transmitted light (step S23). Furthermore, the optical receiver 5 having received the control signal measures optical power of received light (step S25). For example, the transmission optical power detector 1-1-3 of the optical sender 1 measures power of generated continuous light, a single carrier, or a WDM signal. Furthermore, the reception optical power detector 5-12 of the optical receiver 5 measures the optical power of the received light.

Furthermore, the optical interference estimation 6-4 receives an optical power value of the transmitted light from the optical sender 1, receives an optical power value of the received light from the optical receiver 5, and calculates each crosstalk amplitude or an average value of the crosstalk amplitudes based on a difference between the optical power value of the transmitted light and the optical power value of the received light (step S27). Furthermore, the processing proceeds to step S29.

In a case where each crosstalk amplitude or the average value of the crosstalk amplitudes is known or after step S27, the optical interference estimation unit 6-4 determines whether or not the SNR, the OSNR, or the variance $\sigma^2$ of additive white Gaussian noise is unknown (step S29). In a case where the OSNR or the like is unknown, the optical interference estimation unit 6-4 transmits a control signal to the optical receiver 5 via the third controller 6-3. The optical receiver 5 having received the control signal transmits the spectrum calculated by the electric signal analyzer 5-15 to the optical interference estimation unit 6-4, and the optical interference estimation unit 6-4 estimates the SNR or the OSNR using, for example, a method disclosed in, for example, Non-Patent Literature 4 (step S31), and then estimates the variance $\sigma^2$ of the additive white Gaussian noise from the SNR or the OSNR by the above-described method (step S33).

Furthermore, the optical interference estimation unit 6-4 calculates a BER using expressions (23) and (26) or expressions (28) to (31) (step S35). In this step, processing in FIG. 8C is performed. In this regard, assume that parameters other than the crosstalk amplitude, the OSNR, and the like are known. For example, as an average voltage value V of a received symbol, a fixed value, or an average value of values measured for respective symbols is used. Finally, the processing proceeds to step S35.

In a case where the OSNR or the like is known or after step S33, the optical interference estimation unit 6-4 determines whether or not to control the optical sender 1 (step S37). In a case where the optical sender 1 is not controlled, the processing is terminated. On the other hand, in a case where the optical sender 1 is controlled, a method control for selecting at least one of a coding rate and a coding method of the error correction code, and a level of multiplicity modulation of the symbol is selected such that the BER becomes equal to or less than the reference value, and setting it to the optical sender 1 is performed (step S39). Furthermore, the processing is ended.

By so doing, it is possible to calculate an accurate BER by measuring and estimating unknown parameters, and using known parameters as is. Note that an order of steps S21 to S27 and steps S29 to S33 may be rearranged.

Embodiment 2

Figure 10:
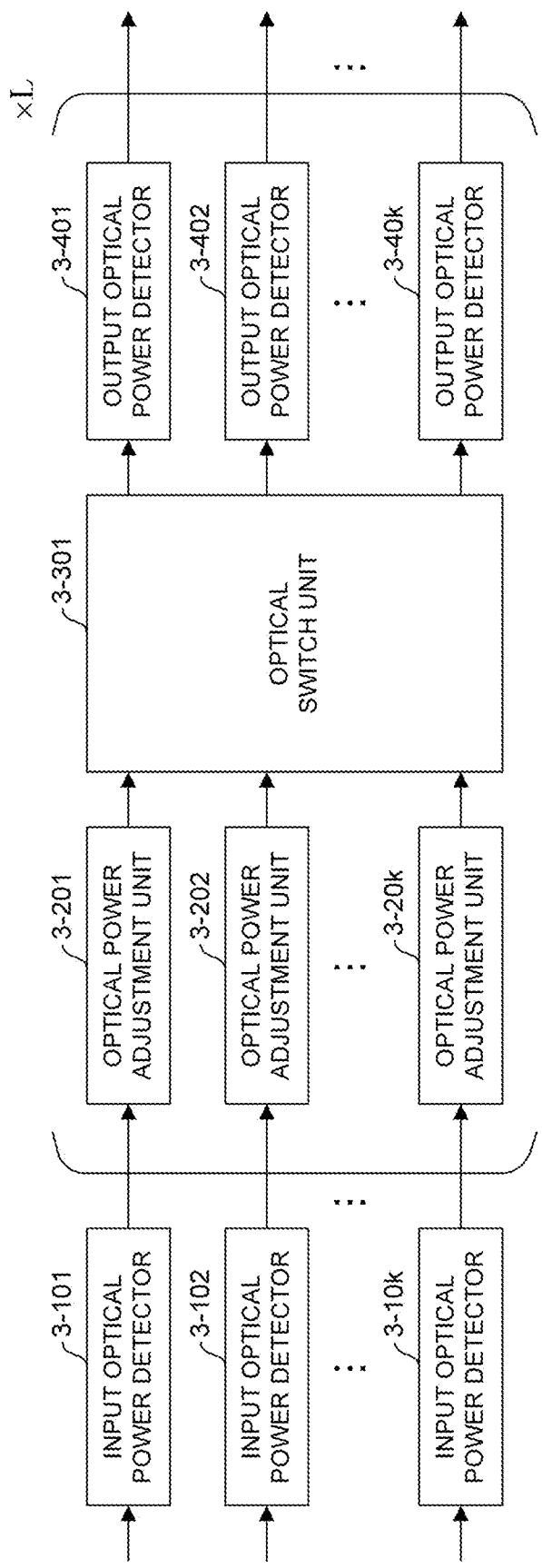
FIG. 10 is a diagram depicting a configuration example of an optical transmission unit relating to a second embodiment.

There is a case where the optical transmission system in FIG. 1 adopts the optical transmission unit 3 illustrated in FIG. 10. The optical transmission unit 3 according to the present embodiment includes input optical power detectors 3-101 to 3-10$k$, optical power adjustment units 3-201 to 3-20$k$, an optical switch unit 3-301, and output optical power detectors 3-401 to 3-40$k$, and the optical power adjustment units 3-201 to 3-20$k$, the optical switch unit 3-301, and the optical power detectors 3-401 to 3-40$k$ are repeatedly provided at L stages depending on cases. k represents the number of input ports or output ports of the optical switch unit 3-301. Note that k is different at each stage in some cases.

First, a case will be considered where L is one. In a case where an SNR and each crosstalk amplitude or an average value of crosstalk amplitudes is known, it is possible to estimate an accurate BER according to expressions (23) and (26) or expressions (28) to (31). In a case where each crosstalk amplitude or the average value of the crosstalk amplitudes is unknown, an absolute value of the crosstalk amplitude is calculated from a square root of a difference between optical power measured by the input optical power detectors 3-101 to 3-10$k$ and optical power measured by the output optical power detectors 3-401 to 3-40$k$ per route in the optical switch unit 3-301.

Next, a case will be considered where L is two or more. In a case where an SNR and each crosstalk amplitude or an average value of crosstalk amplitudes after the L stage are known or can be estimated, it is possible to estimate an upper limit of a BER according to expressions (23) and (26) or expressions (28) to (31). In a case where each crosstalk amplitude or the average value of the crosstalk amplitudes after the L stages is unknown, an absolute value of the crosstalk amplitude is calculated from a square root of a difference between optical power measured by the input optical power detectors 3-101 to 3-10$k$ and optical power measured by the output optical power detectors 3-401 to 3-40$k$ after the L stages. By applying this idea to a switch configuration method as described in Non-Patent Literature 5 or the like, it is possible to apply BER upper limit value estimation to large-scale optical switches connected at multiple stages.

Moreover, the processing described with reference to FIG. 8A in the first embodiment may be performed. That is, it is possible to perform communication using such a combination of the coding rate and the coding method of the error correction code and the level of multiplicity modulation of the symbol, which enables BER to be equal to or less than the reference value.

Figure 11:
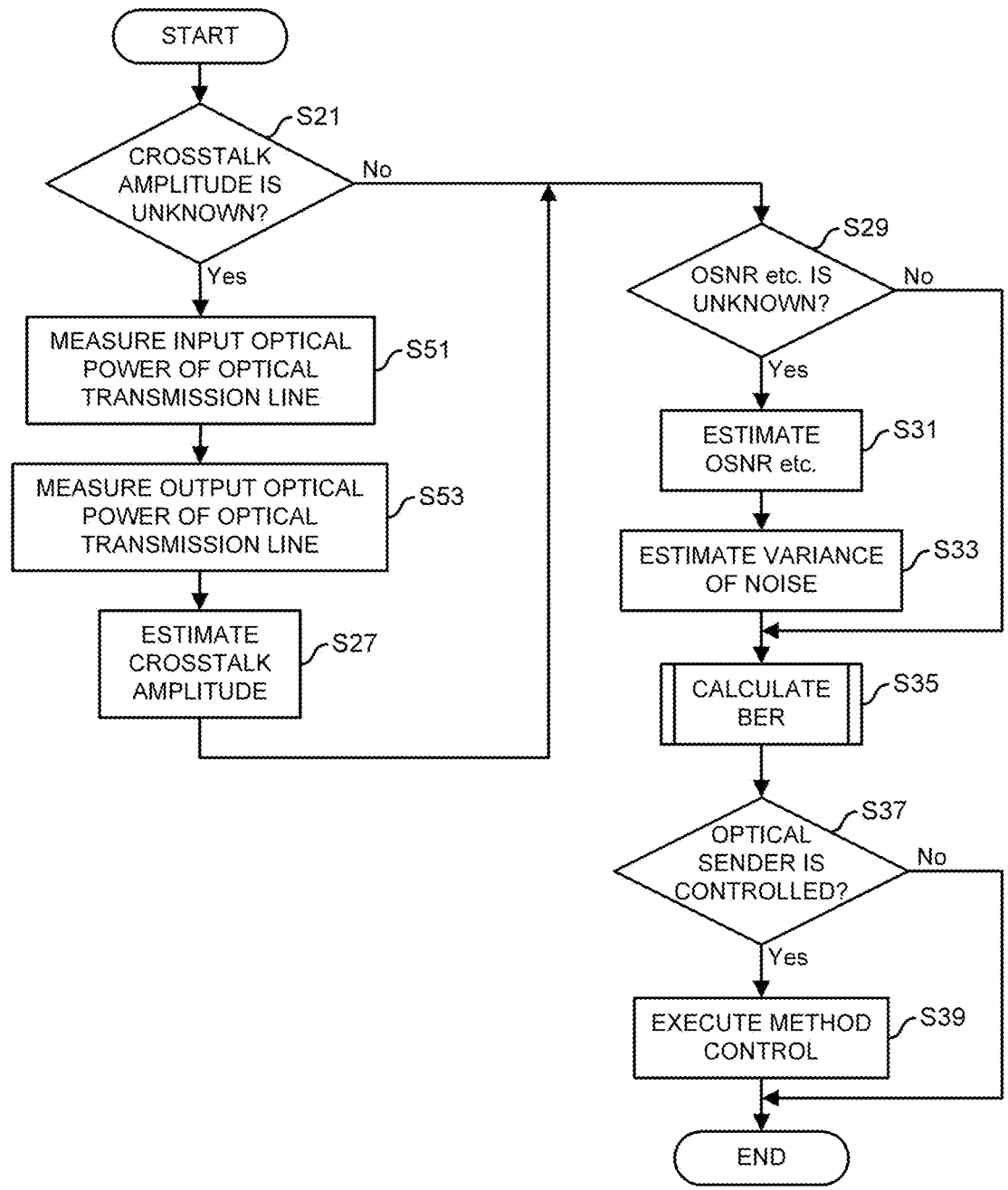
FIG. 11 is a diagram depicting a processing content in an optical transmission system relating to the second embodiment.

Furthermore, an example of processing performed by the optical transmission system according to the present embodiment will be described with reference to FIG. 11.

Note that differences from the first embodiment include executing step S51 instead of step S23, and executing step S53 instead of step S25.

More specifically, the optical interference estimation unit 6-4 transmits control signals to the input optical power detectors 3-101 to 3-10$k$ and the output optical power detectors 3-401 to 3-40$k$ of the optical transmission line 3, which measure power via the second controller 6-2. The input optical power detectors 3-101 to 3-10$k$ of the optical transmission line 3 having received the control signals measure input optical powers to the optical transmission line 3 (step S51). Furthermore, the output optical power detectors 3-401 to 3-40$k$ of the optical transmission line 3 having received the control signals measure output optical power from the optical transmission line 3 (step S53). The optical interference estimation unit 6-4 receives values of the measured input optical power and values of the measured output optical power from the input optical power detectors 3-101 to 3-10$k$ and the output optical power detectors 3-401 to 3-40$k$, calculates a difference between input power and output power in the optical transmission line 3, and thereby obtains each crosstalk amplitude or an average value of the crosstalk amplitudes.

Consequently, according to the present embodiment, even an optical switch of one stage or large-scale optical switches connected at multiple stages can obtain the same effect as that of the first embodiment. That is, it is possible to calculate an accurate BER. Note that the processing in FIG. 9 may be performed in the present embodiment.

Embodiment 3

Figure 12:
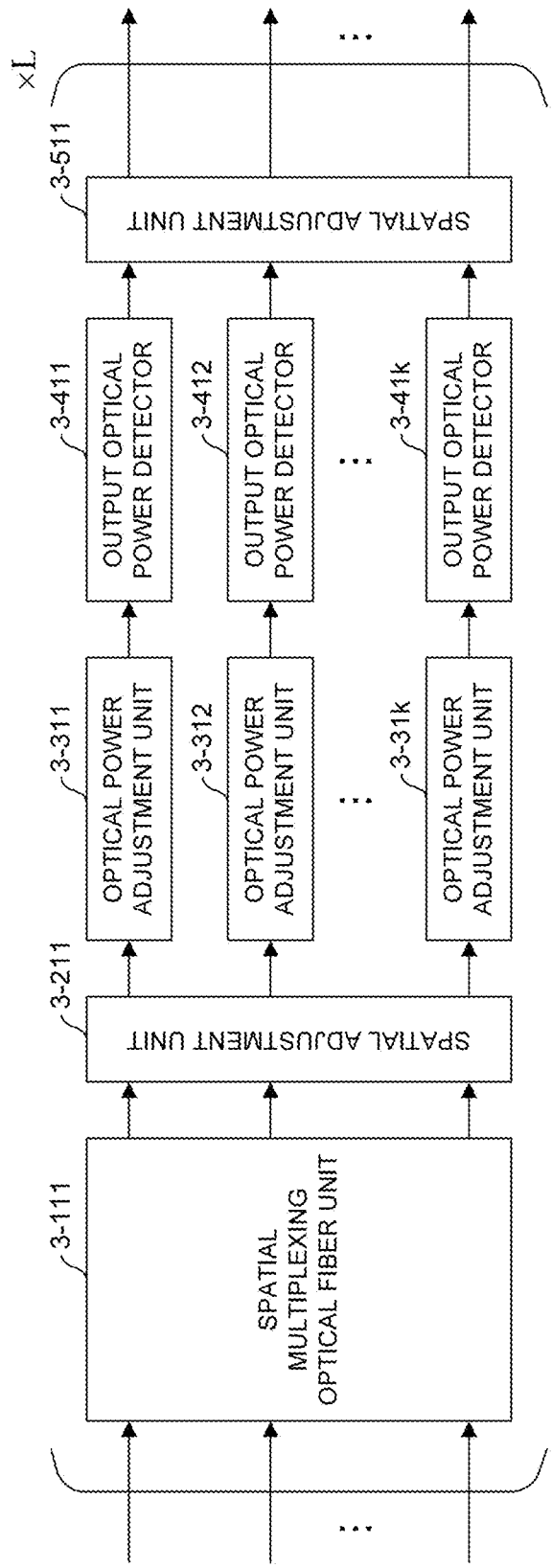
FIG. 12 is a diagram depicting a configuration example of an optical transmission unit relating to a third embodiment.

There may be a case where the optical transmission system in FIG. 1 adopts another optical transmission unit 3 illustrated in FIG. 12. The optical transmission unit 3 relating to the present embodiment includes a spatial multiplexing optical fiber unit 3-111, a spatial adjustment unit 3-211, optical power adjustment units 3-311 to 3-31$k$, output optical power detectors 3-411 to 41$k$, and a spatial adjustment unit 3-511. An order and a combination of these units are changeable, and these units are repeatedly provided at L stages depending on cases. k represents the number of input ports or output ports of the spatial multiplexing optical fiber unit 3-111. Examples of the spatial multiplexing optical fiber unit 3-111 include a multicore fiber that includes plural cores, and/or a multimode fiber through which plural modes are made to propagate.

A single carrier or a WDM signal is input to the spatial multiplexing optical fiber unit 3-111, and is input to the spatial adjustment unit 3-211 via the spatial multiplexing optical fiber unit 3-111. The spatial adjustment unit 3-211 plays a role of converting each spatial resource into a single core mode fiber. Optical power converted by the spatial adjustment unit 3-211 is adjusted by the optical power adjustment units 3-311 to 3-31$k$, and then this optical power is measured by the output optical power detectors 3-411 to 3-41$k$.

In a case where L is one, the spatial adjustment unit 3-511 transmits an optical signal to each optical receiver. In a case where L is two or more, the spatial adjustment unit 3-511 plays a role of a conversion function of converting input light into a format (a multicore or a multimode) that can be inputted to a next spatial multiplexing optical fiber, and connecting from a single mode fiber to a specific core or mode of the spatial multiplexing fiber. In a case where L is two or more and L is a maximum value, the spatial adjustment unit 3-511 transmits an optical signal to each optical receiver similar to the case where L is one. Note that, in the case where L is two or more and L is the maximum value, the output optical power detectors 3-411 to 41$k$ and the spatial adjustment unit 3-511 are arranged on the receiver side depending on cases.

Similar to the second embodiment, according to the present embodiment, it is possible to estimate an accurate BER according to expressions (23) and (26) or expressions (28) to (31). In a case where each crosstalk amplitude or an average value of the crosstalk amplitudes is unknown, an absolute value of the crosstalk amplitude is calculated from a square root of a difference between optical power measured by the transmission optical power detector 1-1-3 and optical power measured by the output optical power detectors 3-411 to 3-41$k$. Similarly, in a case where an SNR or an OSNR is unknown, the SNR or the OSNR is estimated by, for example, a method disclosed in Non-Patent Literature 4 from the frequency waveform (spectrum) calculated by the electric signal analyzer 5-15. A series of processing according to the present embodiment are the same as those in FIG. 11. Consequently, it is possible to apply the present embodiment to a spatial multiplexing optical fiber of one stage and spatial multiplexing optical fibers connected at multiple stages, and obtain the same effect as that of the first embodiment.

Embodiment 4

In the first to third embodiments, the BER is calculated according to expressions (23) and (26) or expressions (28) to (31). However, it is possible to confirm that, as illustrated in FIGS. 5 to 7, as the number of interferences N increases, a penalty or a distribution error decreases between the conventional technique and the embodiments. Consequently, when the number of interferences N exceeds a value set in advance, calculation expressed by expressions (32) and (33) and corresponding to the conventional technique may be applied.

Figure 13:
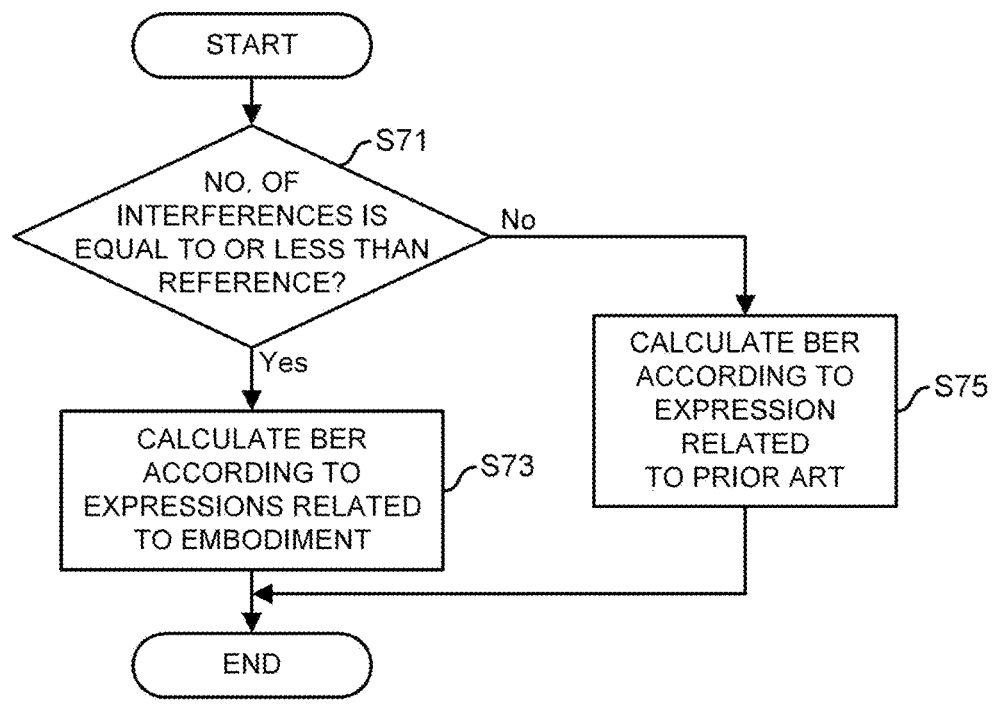
FIG. 13 is a diagram depicting a processing content relating to a fourth embodiment.

That is, the interference estimation unit 6-4 determines whether or not the number of interferences N is equal to or less than a reference (FIG. 13: step S71). In a case where the number of interferences N is equal to or less than the reference, the interference estimation unit 6-4 calculates a BER according to expressions (23) and (26) or expressions (28) to (31) (step S73). In this step, the processing illustrated in FIG. 8C is performed. Then, the processing is finished. On the other hand, in a case where the number of interferences N exceeds the reference, the interference estimation unit 6-4 calculates a BER according to expressions (32) and (33) (step S75). Then, the processing is finished.

By so doing, in the case where the number of interferences N exceeds the reference, it is possible to omit calculation of a special function such as the 0th order modified Bessel function that is required in expressions (23) and (26) or expressions (28) to (31), so that it is possible to reduce a calculation scale, and contribute to a higher speed and lower power consumption of the calculation processing. However, BER accuracy in this regard slightly lowers.

Although the embodiments of the present invention were explained above, the present invention is not limited to these. Elements in respective embodiments may be combined arbitrarily. Moreover, in each embodiment, an arbitrary element may be deleted to implement. As for processing flows, even if the processing result is not changed, an order of steps may be rearranged or plural steps may be executed in parallel. Note that the BER estimation itself may be calculated in a computer of another system instead of elements within the optical transmission system such as the optical interference estimation unit 6-4.

Figure 14:
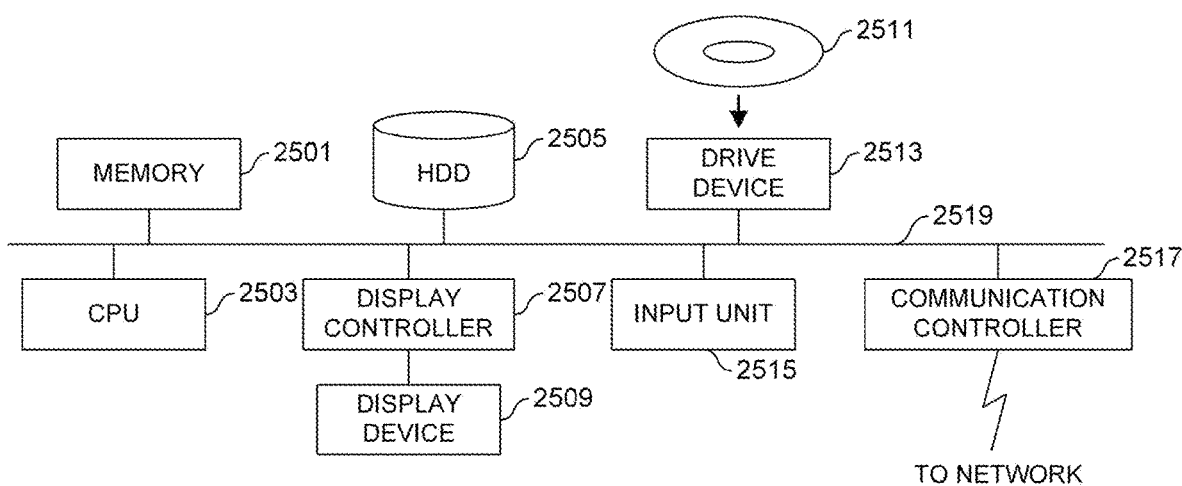
FIG. 14 is a diagram depicting a functional configuration example of a computer in case where a controller is implemented by the computer.

The aforementioned controller 6 is, for example, a computer apparatus, and as illustrated in FIG. 14, a memory 2501, Central Processing Unit (CPU) 2503, a Hard Disk Drive (HDD) 2505, a display controller 2507 connected to a display device 2509, a drive device 2513 for a removable disk 2511, an input unit 2515, and a communication controller 2517 for connection with a network are connected through a bus 2519. Note that the HDD may be a storage device such as a Solid State Drive (SSD). An operating system (OS) and an application program for performing the processing in the embodiments, are stored in the HDD 2505, and when executed by the CPU 2503, they are read out from the HDD 2505 to the memory 2501. According to processing contents of the application program, the CPU 2503 controls the display controller 2507, the communication controller 2517, and the drive device 2513, and causes them to perform predetermined operations. Moreover, intermediate processing data is stored mainly in the memory 2501, however, it may be stored in the HDD 2505. For example, the application program to perform the aforementioned processing is stored in the computer-readable removable disk 2511 and distributed, and then it is installed into the HDD 2505 from the drive device 2513. It may be installed into the HDD 2505 via the network such as the Internet and the communication controller 2517. In the computer apparatus as mentioned above, the hardware such as the CPU 2503 and the memory 2501, programs such as the OS and the application programs systematically cooperate with each other, so that various functions as described above in details are realized.

Not only the controller 6 may be implemented in one apparatus, but also functions of the controller 6 may be distributedly implemented in plural apparatuses. In addition, the CPU may be Graphics Processing Unit (GPU), Field-Programmable Gate Array (FPGA) or the like.

The aforementioned embodiments are outlined as follows.

A method relating to a first mode of the embodiments is executed by a controller in an optical transmission system in which an optical sender and an optical receiver are connected each other through an optical transmission unit that utilizes plural spatial resources and coherent detection is used, and includes processing of mapping an amplitude of each crosstalk for different spatial resource in the optical transmission unit onto an independent variable axis different from a time axis as a sine wave distribution; and estimating quality of an optical signal in the optical transmission unit by using a product of sine wave distributions, which is formed by a sum of amplitudes of crosstalks based on a property that a square of a difference in an amplitude between the independent variable used in the mapping and total noise is non-negative.

By doing so, it is possible to estimate the quality of the optical signals with higher accuracy than a conventional art in which the amplitude distribution of the crosstalk is approximated as the Gaussian distribution. As described above, the quality includes a bit error rate, variance of additive white Gaussian noise $\sigma^2$, SNR or OSNR, and each crosstalk amplitude or an average value of crosstalk amplitudes.

Incidentally, in case where a phase modulation signal is transmitted and received in the optical transmission system, the quality of the optical signal may be estimated by using an expression representing a bit error rate BER

[Expression 35]

$$BER \leq \min_s \left\{ \frac{1}{2s\sigma\sqrt{2\pi}} e^{\frac{s^2\sigma^2}{2}} \times \left[ \sum_{q=1}^{G-1} \left(e^{-sD_{2q}} - e^{-sD_{2q-1}}\right) \cdot M_{X|0}(s) + \sum_{q=1}^{H-1} \left(e^{-sE_{2q}} - e^{-sE_{2q-1}}\right) \cdot M_{X|1}(s) \right] \right\}$$

[Expression 36]

$$M_{X|b}(s) = \prod_{i=1}^{N} J_0(2sA_{XT|b,i}),$$

wherein the independent variable is s (s>0), the variance of the additive white Gaussian noise is $\sigma^2$, a g-th threshold of symbol determination is $D_g$ ($D_{g+1} > D_g$), a h-th threshold of symbol determination is $E_h$ ($E_{h+1} > E_h$), a total number of thresholds $D_g$ is G, a total number of thresholds $E_h$ is H, a characteristic function of crosstalk when a bit b∈ {0, 1} is transmitted is $M_{x|b}(s)$, the number of crosstalks is N, a 0th order modified Bessel function is $J_0(\cdot)$, an amplitude of an i-th crosstalk when each bit b∈ {0, 1} is transmitted is $A_{XTb,i}$, and the bit error rate is BER.

With these expressions, it is possible to describe a relationship among BER, the amplitude of crosstalk and the variance $\sigma^2$ of the additive white Gaussian noise. Incidentally, expression (26) is generalized like the first expression of them.

Moreover, in case where a phase modulation signal (BPSK signal) composed of binary symbols or a phase modulation signal (QPSK signal) composed of quadrature symbols is transmitted and received in the optical transmission system, the quality of the optical signal may be estimated by using an expression representing a bit error rate BER

[Expression 37]

$$BER_{BPSK} \leq \min_s \left\{ \frac{1}{2s\sigma\sqrt{\pi}} e^{\frac{s^2\sigma^2}{4}} \times \left\{ e^{sV} \cdot E[M_{X|0}(s)] + e^{-sV} \cdot E[M_{X|1}(s)] \right\} \right\}$$

[Expression 38]

$$BER_{QPSK} \leq \min_s \left\{ \frac{1}{2s\sigma\sqrt{2\pi}} e^{\frac{s^2\sigma^2}{2}} \times \left\{ e^{sV} \cdot E[M_{X|0}(s)] + e^{-sV} \cdot E[M_{X|1}(s)] \right\} \right\}$$

[Expression 39]

$$E[M_{X|0}(s)] = \left(\frac{1}{2}\right)^N \times \sum_{i=0}^{N} \left\{ \binom{N}{i} \cdot \prod_{k=1}^{i} \left[ \frac{-1 - J_0(2sA_{XT,k})}{2} \right] \right\}$$

[Expression 40]

$$E[M_{X|1}(s)] = \left(\frac{1}{2}\right)^N \times \sum_{i=0}^{N} \left\{ \binom{N}{i} \cdot \prod_{k=1}^{i} \left[ \frac{1 + J_0(2sA_{XT,k})}{2} \right] \right\},$$

wherein the independent variable is s (s>0), the variance of the additive white Gaussian noise is $\sigma^2$, a voltage value of a received symbol is V, an ensemble average is $E(\cdot)$, a characteristic function of crosstalk when a bit b∈ {0, 1} is transmitted is $M_{x|b}(s)$, the number of crosstalks is N, 0th order modified Bessel function is $J_0(\cdot)$, and an amplitude of a k-th crosstalk when each bit b∈ {0, 1} is transmitted is $A_{XTb,k}$.

When BPSK or QPSK is used, it is possible to accurately calculate BER or the like by using the aforementioned expressions.

Furthermore, the aforementioned controller may estimate the quality of the optical signal by using the amplitude of each crosstalk or an average value of amplitudes of all crosstalks, which are estimated from a difference in optical power between input and output in the optical transmission unit or a difference in optical power between the optical sender and the optical receiver. On the other hand, the aforementioned controller may estimate variance $\sigma^2$ of the additive white Gaussian noise from the estimated signal-to-noise power ratio or optical signal-to-noise ratio, and estimate the quality of the optical signal by using the estimated variance $\sigma^2$ of the additive white Gaussian noise. Thus, the quality of the optical signal may be specified by using a measured value for an unknown parameter.

Moreover, the aforementioned method may further include processing of setting, by the controller, at least one of a modulation method and an error correction code for an optical signal generated by the optical sender based on the estimated quality of the optical signal. When the BER or the like can be accurately estimated as described above, it becomes possible to set an appropriate modulation method and/or error correction code without expecting extra margin. Thereby, it becomes possible to perform efficient optical communication in the optical transmission unit.

For example, the aforementioned method may further include processing of setting, by the controller, a modulation method (e.g. a level of multiplicity modulation) for an optical signal generated by the optical sender so that the bit error rate is equal to or less than a reference in case where an error correction code for the optical signal generated by the aforementioned optical sender is a specific error correction code. In addition, the aforementioned method may further include processing of setting, by the controller, at least one of a coding rate and a coding method of an error correction code for an optical signal generated by the optical sender so that the bit error rate is equal to or less than a reference in case where a modulation method for an optical signal generated by the aforementioned optical sender is a specific modulation method. Both of the modulation method and the error correction code may be set, however, only one of them may be set.

Moreover, the aforementioned controller may calculate, as the quality of the optical signal, the average of amplitudes of crosstalks from the aforementioned expression, in case where the bit error rate is known, and the variance $\sigma^2$ of the additive white Gaussian noise is known or derivable. On the other hand, the aforementioned controller may calculate, as the quality of the optical signal, the variance $\sigma^2$ of the additive white Gaussian noise from the aforementioned expression, in case where the bit error rate and the amplitude of each crosstalk or the average value of the amplitudes of all crosstalks are known. When the variance $\sigma^2$ of the additive white Gaussian noise is obtained, it is possible to derive SNR or OSNR.

Furthermore, the aforementioned method may further include processing of estimating, by the controller, the quality of the optical signal by an expression in which amplitude distribution of crosstalk is approximated as Gaussian distribution, in case where the number of crosstalks N exceeds a reference. Because a difference from a value calculated by the aforementioned expression becomes less when the number of crosstalks N increases, the expression in the conventional art may be adopted in order to reduce a calculation amount.

Incidentally, when the number of crosstalks N exceeds the reference, the controller may estimate the quality of the optical signal by using a second expression representing a bit error rate BER

[Expression 41]

$$BER_{BPSK} \leq$$

$$\left(\frac{1}{2}\right)^{N+1} \sum_{k=0}^{N} \left\{ \binom{N}{k} \cdot Q\left[\frac{V}{\sqrt{\sigma^2/2 + N \cdot \sigma_x^2}}\right] + \binom{N}{k} \cdot Q\left[\frac{-V}{\sqrt{\sigma^2/2 + N \cdot \sigma_x^2}}\right] \right\}$$

[Expression 42]

$$BER_{QPSK} \leq$$

$$\left(\frac{1}{2}\right)^{N+1} \sum_{k=0}^{N} \left\{ \binom{N}{k} \cdot Q\left[\frac{V}{\sqrt{\sigma^2 + N \cdot \sigma_x^2}}\right] + \binom{N}{k} \cdot Q\left[\frac{-V}{\sqrt{\sigma^2 + N \cdot \sigma_x^2}}\right] \right\},$$

wherein a Q function is $Q(\cdot)$ and the expected value of the variance of crosstalk is $\sigma_x^2$.

An estimation method relating to a second mode of the embodiments is an estimation method for estimating an upper limit value of a bit error rate in an optical transmission unit for an optical transmission system in which an optical sender and an optical receiver are connected each other through the optical transmission unit that utilizes plural spatial resources, and coherent detection is used, and the estimation method includes processing of (A) calculating an amplitude of each crosstalk for different spatial resource in the optical transmission unit based on a measurement result of optical power in the optical sender and a measurement result of optical power in the optical receiver; (B) calculating variance of additive white Gaussian noise in the optical transmission system from a Signal-to-Noise Power Ratio or an Optical Signal-to-Noise Power Ratio, which is obtained based on an electric signal after coherent detection and photoelectric conversion; and (C) by changing a value of an independent variable in a formula of the bit error rate, searching for a minimum value of the formula as the upper limit value of the bit error rate, wherein the formula is represented by the amplitude of each crosstalk, the variance of the additive white Gaussian noise and the independent variable that is different from a time axis.

By executing this estimation method, it becomes possible to obtain an accurate bit error rate (BER). Note that the amplitude of each crosstalk may be an average value of the amplitudes of the crosstalks as a simplified method.

Incidentally, the aforementioned formula may be represented so as to include a 0th order modified Bessel function for the aforementioned independent variable and the amplitude of each crosstalk. This is a point different from the conventional art.

Incidentally, in case where a phase modulation signal is transmitted and received in the optical transmission system, the aforementioned formula may be

[Expression 43]

$$\frac{1}{2s\sigma\sqrt{2\pi}}e^{\frac{s^2\sigma^2}{2}} \times \left[\sum_{q=1}^{G-1}\left(e^{-sD_{2q}} - e^{-sD_{2q-1}}\right) \cdot \right.$$

$$\left. M_{X|0}(s) + \sum_{q=1}^{H-1}\left(e^{-sE_{2q}} - e^{-sE_{2q-1}}\right) \cdot M_{X|1}(s)\right]$$

[Expression 44]

$$M_{X|b}(s) = \prod_{i=1}^{N} J_0(2sA_{XT|b,i}),$$

wherein the independent variable is s (s>0), the variance of the additive white Gaussian noise is $\sigma^2$, a g-th threshold of symbol determination is $D_g$ ($D_{g+1}>D_g$), a h-th threshold of symbol determination is $E_h$ ($E_{h+1}>E_h$), a total number of thresholds $D_g$ is G, a total number of thresholds $E_h$ is H, a characteristic function of crosstalk when a bit b∈{0, 1} is transmitted is $M_{x|b}(s)$, the number of crosstalks is N, the 0th order modified Bessel function is $J_0(\cdot)$, and an amplitude of an i-th crosstalk when each bit b∈{0, 1} is transmitted is $A_{XT|b,i}$. In this regards, expression (26) is generalized like the aforementioned expression.

Moreover, in case where a phase modulation signal composed of binary symbols (BPSK signal) or a phase modulation signal composed of quadrature symbols (QPSK signal) is transmitted and received in the optical transmission system, the aforementioned formula for the BPSK signal may be

[Expression 45]

$$\frac{1}{2s\sigma\sqrt{\pi}}e^{\frac{s^2\sigma^2}{4}} \times \left\{e^{sV} \cdot E[M_{X|0}(s)] + e^{-sV} \cdot E[M_{X|1}(s)]\right\}$$

and the aforementioned formula for the QPSK signal may be

[Expression 46]

$$\frac{1}{2s\sigma\sqrt{2\pi}}e^{\frac{s^2\sigma^2}{2}} \times \left\{e^{sV} \cdot E[M_{X|0}(s)] + e^{-sV} \cdot E[M_{X|1}(s)]\right\}$$

[Expression 47]

$$E[M_{X|0}(s)] = \left(\frac{1}{2}\right)^N \times \sum_{i=0}^{N}\left\{\binom{N}{i} \cdot \prod_{k=1}^{i}\left[\frac{-1-J_0(2sA_{XT,k})}{2}\right]\right\}$$

[Expression 48]

$$E[M_{X|1}(s)] = \left(\frac{1}{2}\right)^N \times \sum_{i=0}^{N}\left\{\binom{N}{i} \cdot \prod_{k=1}^{i}\left[\frac{1+J_0(2sA_{XT,k})}{2}\right]\right\},$$

wherein the independent variable is s (s>0), the variance of the additive white Gaussian noise is $\sigma^2$, a voltage value of a received symbol is V, an ensemble average is E(•), a characteristic function of crosstalk when a bit b∈{0, 1} is transmitted is $M_{x|b}(s)$, the number of crosstalks is N, the 0th order modified Bessel function is $J_0(\cdot)$, and an amplitude of a k-th crosstalk when each bit b∈{0, 1} is transmitted is $A_{XT|b,k}$.

When BPSK or QPSK is used, it is possible to accurately calculate BER or the like by using the aforementioned formula.

In addition, the aforementioned estimation method may further include processing of setting at least one of a modulation method and an error correction code for an optical signal generated by the optical sender based on the searched upper limited value of the bit error rate.

Furthermore, the aforementioned estimation method may further include processing of setting a modulation method for an optical signal generated by the optical sender so that the upper limit value of the bit error rate is equal to or less than a reference in case where an error correction code for the optical signal generated by the aforementioned optical sender is a specific error correction code. In addition, the aforementioned estimation method may further include processing of setting at least one of a coding rate and a coding method of an error correction code for an optical signal generated by the optical sender so that the upper limit value of the bit error rate is equal to or less than a reference in case where a modulation method for an optical signal generated by the aforementioned optical sender is a specific modulation method.

Furthermore, the aforementioned estimation method may further include processing of estimating an upper limit value of the bit error rate by a second formula represented by a function for an expected value $\sigma_x^2$ of variance of crosstalk and the variance of the additive white Gaussian noise, in case where the number of crosstalks N is greater than a reference.

The aforementioned second formula for a phase modulation signal (BPSK signal) composed of binary symbols may be

[Expression 49]

$$BER_{BPSK} \leq \left(\frac{1}{2}\right)^{N+1} \sum_{k=0}^{N}\left\{\binom{N}{k}\cdot Q\left[\frac{V}{\sqrt{\sigma^2/2 + N\cdot\sigma_x^2}}\right] + \binom{N}{k}\cdot Q\left[\frac{-V}{\sqrt{\sigma^2/2 + N\cdot\sigma_x^2}}\right]\right\},$$

and the aforementioned second formula for a phase modulation signal (QPSK signal) composed of quadrature symbols may be

[Expression 50]

$$BER_{QPSK} \leq \left(\frac{1}{2}\right)^{N+1} \sum_{k=0}^{N}\left\{\binom{N}{k}\cdot Q\left[\frac{V}{\sqrt{\sigma^2 + N\cdot\sigma_x^2}}\right] + \binom{N}{k}\cdot Q\left[\frac{-V}{\sqrt{\sigma^2 + N\cdot\sigma_x^2}}\right]\right\},$$

wherein a voltage value of a received symbol is V. a Q function is Q(•), and the expected value of the variance of crosstalk is $\sigma_x^2$, A program for causing a processor to executed the aforementioned method can be created, and the program is stored in various storage mediums.

The invention claimed is:

1. An estimation method for estimating an upper limit value of a bit error rate in an optical transmission unit included in an optical transmission system, comprising:
   calculating an amplitude of each crosstalk for different spatial resource in the optical transmission unit based on a measurement result of optical power in an optical sender and a measurement result of optical power in an optical receiver, wherein the optical sender and the optical receiver are connected each other through the optical transmission unit that utilizes plural spatial resources, and coherent detection is used;
   calculating variance of additive white Gaussian noise in the optical transmission system from a Signal-to-Noise Power Ratio or an Optical Signal-to-Noise Power Ratio, which is obtained based on an electric signal after coherent detection and photoelectric conversion; and
   by changing a value of an independent variable in a formula of the bit error rate, searching for a minimum value of the formula as the upper limit value of the bit error rate, wherein the formula is represented by the amplitude of each crosstalk, the variance of the additive white Gaussian noise and the independent variable that is different from a time axis.

2. The estimation method according to claim 1, wherein the formula is represented so as to include a 0th order modified Bessel function for the independent variable and the amplitude of each crosstalk.

3. The estimation method according to claim 1, wherein a phase modulation signal is transmitted and received in the optical transmission system, and the formula is $$\frac{1}{2s\sigma\sqrt{2\pi}}e^{\frac{s^2\sigma^2}{2}} \times$$

$$\left[\sum_{q=1}^{G-1}\left(e^{-sD_{2q}} - e^{-sD_{2q-1}}\right)\cdot M_{X|0}(s) + \sum_{q=1}^{H-1}\left(e^{-sE_{2q}} - e^{-sE_{2q-1}}\right)\cdot M_{X|1}(s)\right]$$

$$M_{X|b}(s) = \prod_{i=1}^{N} J_0(2sA_{XT|b,i})$$

wherein the independent variable is s (s>0), the variance of the additive white Gaussian noise is $\sigma^2$, a g-th threshold of symbol determination is $D_g$ ($D_{g+1}>D_g$), a h-th threshold of symbol determination is $E_h$ ($E_{h+1}>E_h$), a total number of thresholds $D_g$ is G, a total number of thresholds $E_h$ is H, a characteristic function of crosstalk when a bit b∈ {0, 1} is transmitted is $M_{x|b}(s)$, a number of crosstalks is N, a 0th order modified Bessel function is $J_0(•)$, and an amplitude of an i-th crosstalk when each bit b∈ {0, 1} is transmitted is $A_{XT|b,i}$.

4. The estimation method according to claim 1, wherein a Binary Phase Shift Keying (BPSK) signal or a Quadrature Phase Shift Keying (QPSK) signal is transmitted and received in the optical transmission system, and the formula for the BPSK signal is $$\frac{1}{2s\sigma\sqrt{\pi}}e^{\frac{s^2\sigma^2}{4}} \times \left\{e^{sV}\cdot E[M_{X|0}(s)] + e^{-sV}\cdot E[M_{X|1}(s)]\right\}$$

and the formula for the QPSK signal is $$\frac{1}{2s\sigma\sqrt{\pi}}e^{\frac{s^2\sigma^2}{2}} \times \left\{e^{sV}\cdot E[M_{X|0}(s)] + e^{-sV}\cdot E[M_{X|1}(s)]\right\}$$

$$E[M_{X|0}(s)] = \left(\frac{1}{2}\right)^N \times \sum_{i=0}^{N}\left\{\binom{N}{i}\cdot\prod_{k=1}^{i}\left[\frac{-1 - J_0(2sA_{XT,k})}{2}\right]\right\}$$

$$E[M_{X|1}(s)] = \left(\frac{1}{2}\right)^N \times \sum_{i=0}^{N}\left\{\binom{N}{i}\cdot\prod_{k=1}^{i}\left[\frac{-1 - J_0(2sA_{XT,k})}{2}\right]\right\}$$

wherein the independent variable is s (s>0), the variance of the additive white Gaussian noise is $\sigma^2$, a voltage value of a received symbol is V, an ensemble average is E(•), a characteristic function of crosstalk when a bit b∈ {0, 1} is transmitted is $M_{x|b}(s)$, a number of crosstalks is N, a 0th order modified Bessel function is $J_0(•)$, and an amplitude of a k-th crosstalk when each bit b∈ {0, 1} is transmitted is $A_{XT|b,k}$.

5. The estimation method according to claim 1, further comprising setting at least one of a modulation method and an error correction code for an optical signal generated by the optical sender based on the searched upper limited value of the bit error rate.

6. The estimation method according to claim 1, further comprising setting a modulation method for an optical signal generated by the optical sender so that the upper limit value of the bit error rate is equal to or less than a reference in case where an error correction code for the optical signal generated by the optical sender is a specific error correction code.

7. The estimation method according to claim 1, further comprising setting at least one of a coding rate and a coding method of an error correction code for an optical signal generated by the optical sender so that the upper limit value of the bit error rate is equal to or less than a reference in case where a modulation method for an optical signal generated by the aforementioned optical sender is a specific modulation method.

8. The estimation method according to claim 1, further comprising estimating an upper limit value of the bit error rate by a second formula represented by a function for an expected value $\sigma_x^2$ of variance of crosstalk and the variance of the additive white Gaussian noise, in case where a number of crosstalks N is greater than a reference.

9. The estimation method according to claim 8, wherein the second formula for a Binary Phase Shift Keying (BPSK) signal is $$BER_{BPSK} \leq$$

$$\left(\frac{1}{2}\right)^{N+1} \sum_{k=0}^{N} \left\{ \binom{N}{k} \cdot Q\left[\frac{V}{\sqrt{\sigma^2/2 + N \cdot \sigma_x^2}}\right] + \binom{N}{k} \cdot Q\left[\frac{-V}{\sqrt{\sigma^2/2 + N \cdot \sigma_x^2}}\right] \right\}$$

and the second formula for is $$BER_{QPSK} \leq \qquad [\text{Equation 8}]$$

$$\left(\frac{1}{2}\right)^{N+1} \sum_{k=0}^{N} \left\{ \binom{N}{k} \cdot Q\left[\frac{V}{\sqrt{\sigma^2/2 + N \cdot \sigma_x^2}}\right] + \binom{N}{k} \cdot Q\left[\frac{-V}{\sqrt{\sigma^2/2 + N \cdot \sigma_x^2}}\right] \right\}$$

wherein a voltage value of a received symbol is V, a Q function is Q(•), and the expected value of the variance of crosstalk is $\sigma_x^2$.

10. An estimation apparatus for estimating an upper limit value of a bit error rate in an optical transmission unit within an optical transmission system, comprising:
 a processor; and
 a memory including computer program code, where the memory and the computer program code are configured, with the processor, to cause the estimation apparatus to:
  calculate an amplitude of each crosstalk for different spatial resource in the optical transmission unit based on a measurement result of optical power in an optical sender and a measurement result of optical power in an optical receiver, wherein the optical sender and the optical receiver are connected each other through the optical transmission unit that utilizes plural spatial resources, and coherent detection is used;
  calculate variance of additive white Gaussian noise in the optical transmission system from a Signal-to-Noise Power Ratio or an Optical Signal-to-Noise Power Ratio, which is obtained based on an electric signal after coherent detection and photoelectric conversion; and
  by changing a value of an independent variable in a formula of the bit error rate, search for a minimum value of the formula as the upper limit value of the bit error rate, wherein the formula is represented by the amplitude of each crosstalk, the variance of the additive white Gaussian noise and the independent variable that is different from a time axis.

11. A non-transitory computer-readable storage medium storing a program for causing a processor to execute a process for estimating an upper limit value of a bit error rate in an optical transmission unit within an optical transmission system, the process comprising:
 calculating an amplitude of each crosstalk for different spatial resource in the optical transmission system based on a measurement result of optical power in an optical sender and a measurement result of optical power in an optical receiver, wherein the optical sender and the optical receiver are connected each other through the optical transmission unit that utilizes plural spatial resources, and coherent detection is used;
 calculating variance of additive white Gaussian noise in the optical transmission system from a Signal-to-Noise Power Ratio or an Optical Signal-to-Noise Power Ratio, which is obtained based on an electric signal after coherent detection and photoelectric conversion; and
 by changing a value of an independent variable in a formula of the bit error rate, searching for a minimum value of the formula as the upper limit value of the bit error rate, wherein the formula is represented by the amplitude of each crosstalk, the variance of the additive white Gaussian noise and the independent variable that is different from a time axis.

* * * * *